(12) United States Patent
Kuwabara et al.

(10) Patent No.: US 7,744,104 B2
(45) Date of Patent: Jun. 29, 2010

(54) SUSPENSION ARM AND CUSHION ARM STRUCTURE FOR VEHICLE

(75) Inventors: Naoki Kuwabara, Saitama (JP); Hiroaki Tomita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 308 days.

(21) Appl. No.: 11/978,726

(22) Filed: Oct. 30, 2007

(65) Prior Publication Data

US 2008/0179853 A1 Jul. 31, 2008

(30) Foreign Application Priority Data

Jan. 26, 2007 (JP) ............................. 2007-016130
Jan. 26, 2007 (JP) ............................. 2007-016131
Jan. 26, 2007 (JP) ............................. 2007-016968

(51) Int. Cl.
B60G 3/04 (2006.01)

(52) U.S. Cl. ............................................. 280/124.134

(58) Field of Classification Search ............ 280/124.13, 280/124.134, 124.137, 124.146
See application file for complete search history.

(56) References Cited

U.S. PATENT DOCUMENTS

| | | | | |
|---|---|---|---|---|
| 4,282,949 A | * | 8/1981 | Kopich et al. ............... | 180/252 |
| 5,048,860 A | * | 9/1991 | Kanai et al. ............. | 280/86.757 |
| 5,074,581 A | * | 12/1991 | Matsuoka ............... | 280/124.13 |
| 6,827,361 B2 | * | 12/2004 | Seki ..................... | 280/124.134 |
| 2001/0048207 A1 | | 12/2001 | Handa | |
| 2005/0221936 A1 | | 10/2005 | Seki et al. | |
| 2007/0069494 A1 | * | 3/2007 | Kinjyo et al. ......... | 280/124.106 |
| 2007/0074925 A1 | * | 4/2007 | Seki et al. .................... | 180/374 |

FOREIGN PATENT DOCUMENTS

| JP | 2001-328410 A | 11/2001 |
|---|---|---|
| JP | 2003-2028 A | 1/2003 |
| JP | 2005-280619 A | 10/2005 |

* cited by examiner

*Primary Examiner*—Faye M. Fleming
(74) *Attorney, Agent, or Firm*—Birch, Stewart, Kolasch & Birch, LLP

(57) ABSTRACT

A suspension arm and cushion support structure for a vehicle. A knuckle support part of a rear suspension arm is formed of a plate member extended to the vehicle body inner side relative to a rim of a wheel element so as to cover the lower side of a boot covering a connected part between a drive shaft and a universal joint. The knuckle is supported by the rear suspension arm, and rotatably supports a wheel of the vehicle. A cushion is provided for absorbing shocks transmitted to the wheel, the lower end of the cushion being coaxially supported on the knuckle support part of a lower part of the rear suspension arm.

5 Claims, 23 Drawing Sheets

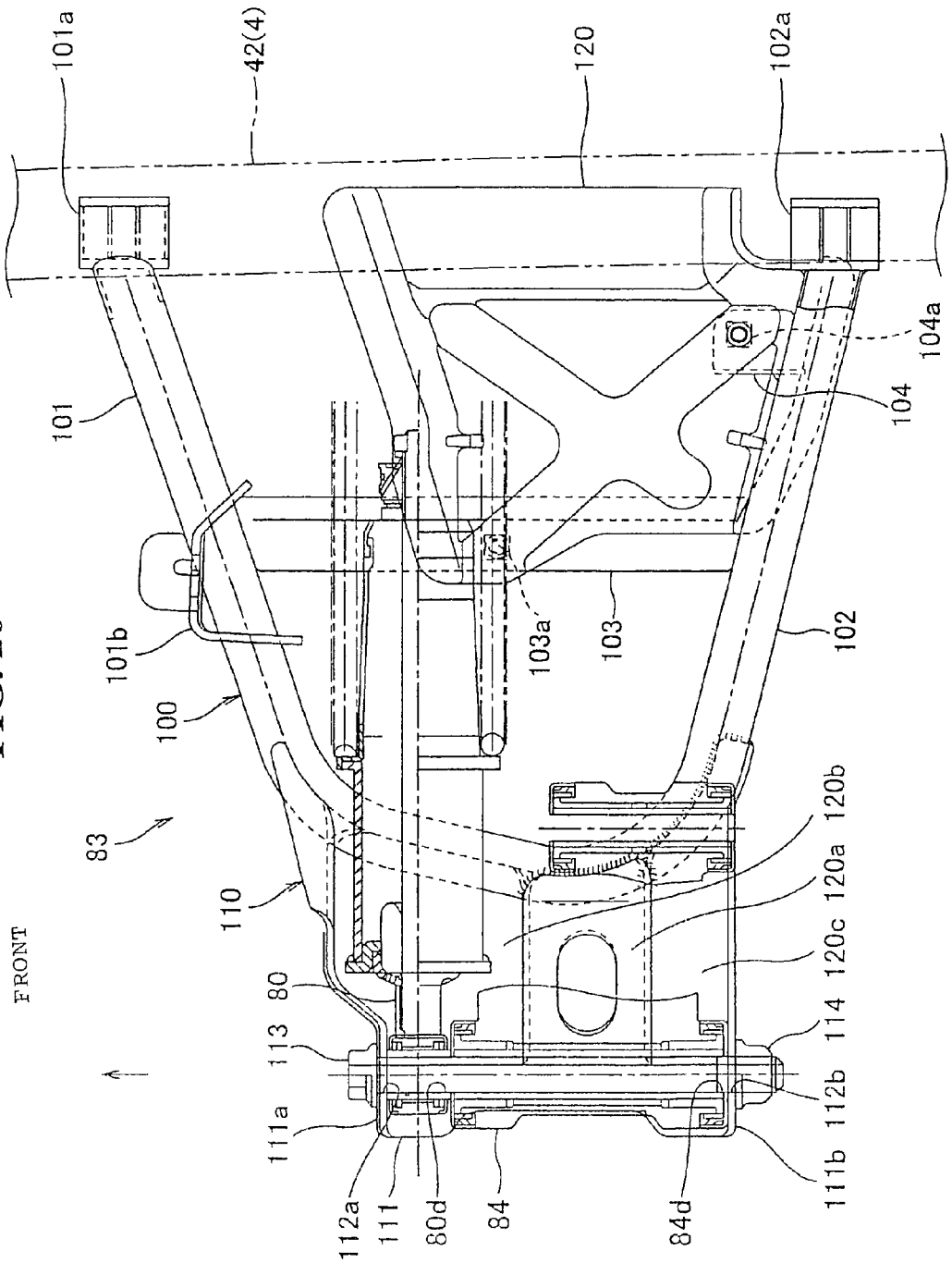

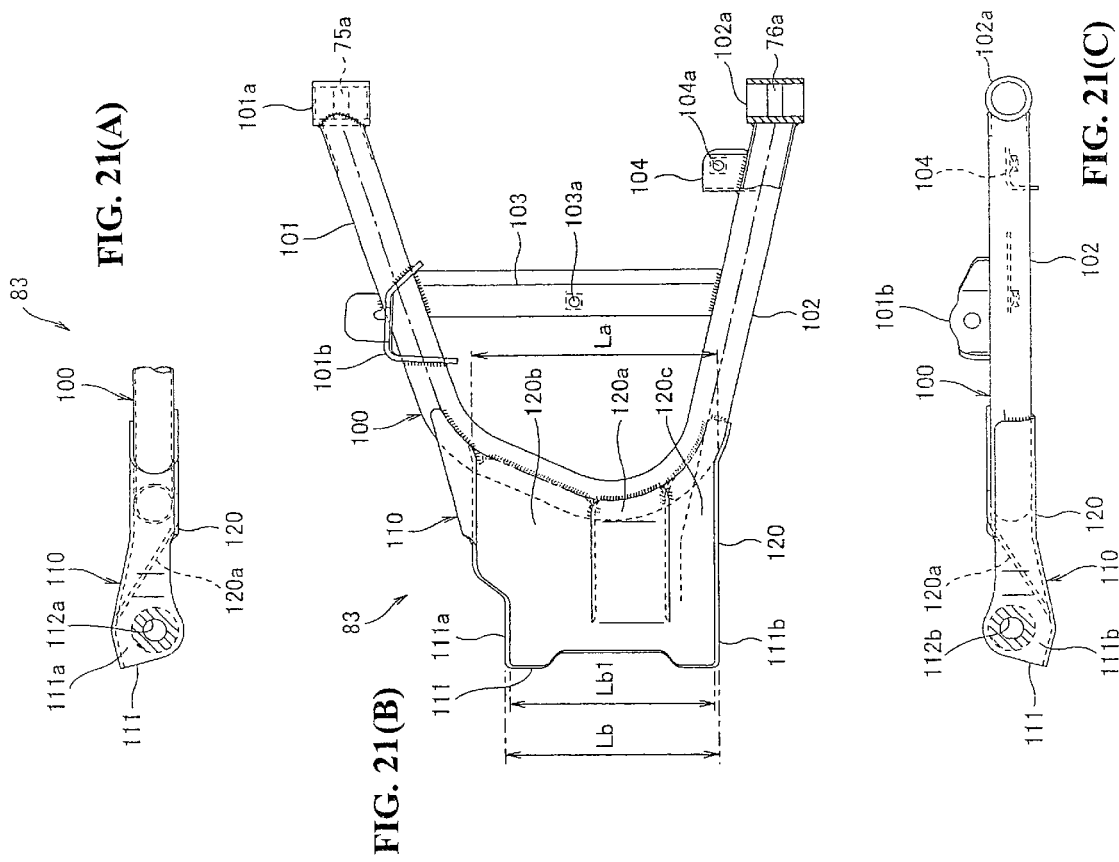

SUSPENSION ARM AND CUSHION ARM STRUCTURE FOR VEHICLE

CROSS-REFERENCE TO RELATED APPLICATION

The present application claims priority under 35 U.S.C. §119 to Japanese Patent Application No. 2007-016130, Japanese Patent Application No. 2007-016131, and Japanese Patent Application No. 2007-016968, each of which was filed Jan. 26, 2007, the entire contents of which are hereby incorporated by reference.

BACKGROUND OF THE INVENTION

1. Field of the Invention

The present invention relates to a suspension arm and cushion arm structure for a vehicle. The suspension arm structure includes a connected part between a drive shaft for transmitting power from an engine and a universal joint provided on the wheel side is covered with a boot. A knuckle is connected to a suspension arm swingably supported on a frame, a hub supported on a drive wheel is rotatably connected to the knuckle through a bearing, an axle is connected to the hub, and a drive wheel for transmitting power from an engine is connected to the axle through a universal joint. Left and right wheels are each swingably and independently suspended on the frame through the suspension arm, and a drive shaft for transmitting power from an engine to each of the wheels, the suspension arm being composed of upper and lower aims, a knuckle being supported by the upper and lower arms, the knuckle rotatably supporting the wheel, and a cushion being provided for absorbing shocks transmitted to the wheel.

2. Description of Background Art

As a vehicle in which left and right wheels are independently suspended, there has been known a vehicle wherein a knuckle is supported by upper and lower suspension arms swingably supported on a vehicle body frame, a wheel element of a wheel is connected to a hub rotatably supported by the knuckle, and each wheel is rotatingly driven by a drive shaft to which power of an engine is transmitted through a final speed reduction mechanism (refer to, for example, Japanese Patent Laid-Open No. 2001-328410).

In this vehicle, the connected part between the drive shaft and the wheel is composed of a universal joint, the connected part between the drive shaft and the universal joint is covered with a boot, and the boot protrudes outward beyond the depth (the width of a rim) of the wheel element of the wheel. Each of the suspension arms in this vehicle is formed in a roughly U shape by connecting one-side ends of front and rear pipes, and the other-side ends of the front and rear pipes are each swingably supported on the vehicle body frame, so that there is a clearance between the front and rear pipes.

When the vehicle body is viewed from the lower side, the boot is exposed through the clearance between the front and rear pipes of each of the suspension arms, so that it may be contemplated that, for all-terrain vehicle running mode, a protective member such as a guard is provided between the front and rear pipes of each of the suspension arms.

In conventional configurations, however, the provision of the protective member would complicate the structure of the suspension arm, and it is necessary, for example, to form the suspension arm in such a shape as to secure an attaching space for the protective member, or to provide the suspension arm with a bracket or the like for attaching the protective member. In addition, it is expected that increases in the number of component part and the weight will arise from the separate provision of the protective members.

In four-wheel vehicles such as ATV (All Terrain Vehicle), a knuckle is connected to a suspension arm swingably supported on a frame, a hub supported on a drive wheel is rotatably connected to the knuckle through a bearing, an axle is connected to the hub, and a drive wheel for transmitting power from an engine is connected to the axle through a universal joint (refer to, for example, Japanese Patent Laid-Open No. 2005-280619).

In such a vehicle, seal members are disposed respectively between the knuckle and the axle and between the knuckle and the hub, and penetration of mud, soil or the like into the bearing is prevented by these seal members.

In conventional configurations, in the case where a sealed bearing provided with a seal for preventing penetration of foreign matter is used as the above-mentioned bearing, the seal member between the knuckle and the axle and the seal member between the knuckle and the hub are not necessary; however, the removal of the seal members would lead to corresponding enlargement of the gap between the knuckle and the axle and the gap between the knuckle and the hub, in the vicinity of the knuckle, so that foreign matter such as mud and soil may penetrate during an ATV running mode. In addition, the gaps formed by omitting the above-mentioned seal members are comparatively large, it is difficult for the foreign matter having once entered to come out.

Furthermore, in conventional configurations, in vehicle having independently suspended left and right wheels, each suspension arm swingably supported on a vehicle body frame is typically composed of an upper arm and a lower arm, a knuckle is supported by the upper and lower arms, a wheel is connected to a hub rotatably supported by the knuckle, and shocks transmitted to the wheel are absorbed by a cushion.

Vehicles of this kind include those in which a cross member is provided at an intermediate part of the lower arm, and the lower end of the cushion is supported on the cross member (refer to, for example, Japanese Patent Laid-Open No. 2005-280619), and those in which the tip of the upper arm is bifurcated to form a bifurcated knuckle support part for supporting a knuckle, and the lower end of the cushion is supported between the bifurcation element parts of the bifurcated knuckle support part (refer to, for example, Japanese Patent Laid-Open No. 2003-002028).

However, in the configuration described in Japanese Patent Laid-Open No. 2005-280619, the cushion support part as a separate component part is provided at an intermediate part of the lower arm, and the number of component parts is therefore increased. In addition, a comparatively large cross member is used for securing the rigidity of the lower arm, and an increase in weight is therefore expected.

On the other hand, in the configuration described in Japanese Patent Laid-Open No. 2003-002028, the lower end of the cushion is supported between the bifurcation element parts of the bifurcated knuckle support part, and not any separate cushion support part is provided, so that an increase in the number of component parts can be suppressed accordingly In this configuration, however, it is impossible to earn the cushion stroke length, and the bifurcation of the knuckle support part leads to a complicated structure.

SUMMARY AND OBJECTS OF THE INVENTION

The present invention has been made in consideration of the above-mentioned circumstances.

Accordingly, it is an object of the present invention to provide a suspension arm structure such that the structure of each suspension arm can be prevented from being complicated and that increases in the number of component part and in weight can be suppressed, and in which foreign matter that having entered into a gap can be easily discharged. Another object is to provide a cushion support structure with which increases in the number of component parts and in weight and complication of structure can be obviated, while securing a cushion stroke length.

In order to solve the above-mentioned problems, a suspension arm structure includes left and right wheels each independently and swingably suspended on a frame through a suspension arm, a drive shaft for transmitting power from an engine to each of the wheels, a hub connected to a wheel element of the wheel, a knuckle support part of the suspension arm being connected to the hub through a knuckle, an axle connected to the hub, the drive shaft being connected to the axle through a universal joint, and the connected part being covered with a boot, wherein the knuckle support part of the suspension arm is formed by use of a plate member extended from a rim of the wheel element toward the vehicle body inner side so as to cover the lower side of the boot.

According to the present invention, the knuckle support part of the suspension arm is composed by use of a plate member extended from the rim of the wheel element toward the vehicle body inner side so as to cover the lower side of the boot, so that the boot can be protected against flying stones and obstacles by the knuckle support part. In addition, increases in the number of component parts and in weight can be suppressed, and complication of the structure of the suspension arm can be obviated, as compared with the case where outboard-side boot covers are provided as separate members.

In this configuration, preferably, the suspension arm includes a pipe member swingably supported on the frame, and the knuckle support part is joined to the pipe member and extended between the pipe member and the rim. According to this configuration, the knuckle support part is extended between the pipe member swingably supported on the frame and the rim, the lower side of the boot protruding beyond the rim of the wheel element can be securely covered and protected.

In this case, preferably, a cushion unit is interposed between the suspension arm and the frame, and the knuckle support part covers the lower side of a lower end part of the cushion unit. According to this configuration, since the knuckle support part covers the lower side of the lower end part of the cushion unit, it is possible to cover both the boot and the cushion unit by the knuckle support part.

In order to solve the above problems, according to the present invention, a drive wheel suspension structure includes a knuckle connected to a suspension arm swingably supported on a frame, a hub supported on a drive wheel, the hub being rotatably connected to the knuckle through a bearing, an axle connected to the hub, and a drive shaft for transmitting power from an engine, the drive shaft being connected to the axle through a universal joint, wherein the bearing is composed of a sealed bearing, and a gap between the knuckle and an outer peripheral surface of the axle is formed to have a spacing substantially constant from the depth side toward this side or to have a tapered spacing so that the gap is gradually widened along the direction from the depth side toward this side, and a seal part of the sealed bearing is opposed to the depth side of the spacing.

According to this invention, the bearing for bearing the hub is composed of a sealed bearing, the gap between the knuckle and the outer peripheral surface of the axle is formed to have a spacing substantially constant from the depth side toward this side or to have a tapered spacing so that the gap is gradually widened along the direction from the depth side toward this side, and the seal part of the sealed bearing is opposed to the depth side of the spacing, so that even when a foreign matter such as mud has entered into the gap between the knuckle and the outer peripheral surface of the axle, the foreign matter can be discharged to the exterior, attendant on the rotation during running.

In this case, preferably, the suspension arm is composed of upper and lower arms, and the axle is extended with the spacing from the knuckle connected to the upper and lower arms. This configuration ensures that even when a foreign matter such as mud has entered into the gap between the knuckle and the outer peripheral surface of the axle, the foreign matter can be discharged to the exterior, attendant on the rotation during running.

In addition, preferably, the axle has a large-diameter part as its part connected to the universal joint, and the knuckle is extended along the outer shape of the axle so as to cover the large-diameter part. This configuration ensures that no step is present in the gap between the knuckle and the axle, whereby it can be ensured that a foreign matter such as mud will hardly be caught in the gap.

Further, preferably, the gap between the knuckle and the outer peripheral surface of the hub is formed to have a spacing substantially constant from the depth side toward this side or to have a tapered spacing so that the gap is gradually widened along the direction from the depth side toward this side, and a seal part of the sealed bearing is opposed to the depth side of the spacing. This configuration ensures that even when a foreign matter such as mud has entered into the gap between the knuckle and the outer peripheral surface of the hub, the foreign matter can be discharged to the exterior, attendant on the rotation during running.

Further, according to the present invention, a drive wheel suspension structure includes a knuckle connected to a suspension arm swingably supported on a frame, a hub supported on a drive wheel, the hub being rotatably connected to the knuckle through a bearing, an axle connected to the hub, and a drive shaft for transmitting power from an engine, the drive shaft being connected to the axle through a universal joint, wherein the bearing is composed of a sealed bearing, and a gap between the knuckle and an outer peripheral surface of the hub is formed to have a spacing substantially constant from the depth side toward this side or to have a tapered spacing so that the gap is gradually widened along the direction from the depth side toward this side, and a seal part of the sealed bearing is opposed to the depth side of the spacing.

According to this invention, the bearing for bearing the hub is composed of a sealed bearing, the gap between the knuckle and the outer peripheral surface of the hub is formed to have a spacing substantially constant from the depth side toward this side or to have a tapered spacing so that the gap is gradually widened along the direction from the depth side toward this side, and the seal part of the sealed bearing is opposed to the depth side of the spacing, so that even when a foreign matter such as mud has entered into the gap between the knuckle and the outer peripheral surface of the hub, the foreign matter can be discharged to the exterior, attendant on the rotation during running.

Still further, according to the present invention, a cushion support structure includes left and right wheels each swingably and independently suspended on a frame through a suspension arm, and a drive shaft for transmitting power from an engine to each of the wheels, the suspension arm being included of upper and lower arms, a knuckle being supported by the upper and lower arms, the knuckle rotatably supporting the wheel, and a cushion being provided for absorbing shocks transmitted to the wheel, wherein the lower end of the cushion is coaxially supported on a knuckle support part of the lower arm.

According to this invention, the lower end of the cushion is coaxially supported on the knuckle support part of the lower arm, so that increases in the number of component parts and in weight and complication of structure can be obviated, for example, by using in common a support component part for the knuckle and the lower end of the cushion, while securing a cushion stroke length.

In this case, preferably, the knuckle support part of the lower arm is formed by bending a plate member, and the knuckle and the lower end of the cushion are so supported as to be clamped between parts of the plate member. With this configuration, the modulus of section of the knuckle support part can be enhanced, and the rigidity of the knuckle support part can be secured sufficiently.

In addition, in this case, the knuckle support part of the lower arm is preferably larger in width at its connection part connected to an arm part than at its knuckle and cushion lower end support part. With this configuration, the strength of connection between the knuckle support part and the arm part can be secured sufficiently, and the rigidity of the knuckle support part can be secured sufficiently.

In this case, the lower end of the cushion is preferably located on the vehicle body front side relative to the knuckle. With this configuration, interference between the cushion and the drive shaft can be obviated. In addition, preferably, the width of the upper arm is smaller than the width of the lower arm, and the cushion is located on the front side of the upper arm. With this configuration, interference between the cushion and the upper arm can be obviated.

In addition, a connected part between the drive shaft and an axle connected to a hub supported by the knuckle is preferably covered with a boot, and the knuckle support part covers the lower side of the boot. With this configuration, the lower side of the boot and the lower end of the cushion can be protected by the knuckle support part. Therefore, it is unnecessary to separately provide an outboard-side boot cover, so that the number of component parts can be reduced, and an increase in weight and complication of structure can be obviated.

Effects of the Invention Include the Following:

According to the present invention, the knuckle support part of the suspension arm is formed by use of a plate member extended from the rim of the wheel element toward the vehicle body inner side so as to cover the lower side of the boot, so that it is possible to obviate complication of the structure of the suspension arm and to suppress increases in the number of component part and in weight.

In addition, since the knuckle support part is extended between the pipe member swingably supported on the frame and the rim, it is possible to securely cover and protect the lower side of the boot protruding beyond the rim of the wheel element.

Further, since the knuckle support part covers the lower side of the lower end part of the cushion unit, it is possible to protect both the boot and the cushion unit by the knuckle support part.

In the present invention, the bearing for bearing the hub is composed of a sealed baring, the gap between the knuckle and the outer peripheral surface of the axle is formed to have a spacing substantially constant from the depth side toward this side or to have a tapered spacing so that the gap is gradually widened along the direction from the depth side toward this side, and the seal part of the sealed bearing is opposed to the depth side of the spacing, so that even when a foreign matter such as mud has entered into the gap between the knuckle and the outer peripheral surface of the axle, the foreign matter can be discharged to the exterior, attendant on the rotation during running.

In addition, since the suspension arm is composed of upper and lower arms, and the axle is extended with the above-mentioned spacing from the knuckle connected to the upper and lower arms, it is ensured that even when a foreign matter such as mud has entered into the gap between the knuckle and the outer peripheral surface of the axle, the foreign matter can be discharged to the exterior, attendant on the rotation during running.

In addition, since the axle has a large-diameter part as its part connected to the universal joint, and the knuckle is extended along the outer shape of the axle so as to cover the large-diameter part, no step is present in the gap between the knuckle and the axle, whereby it can be ensured that a foreign matter such as mud will hardly be caught in the gap.

Besides, since the gap between the knuckle and the outer peripheral surface of the hub is formed to have a spacing substantially constant from the depth side toward this side or to have a tapered spacing so that the gap is gradually widened along the direction from the depth side toward this side, and the seal part of the sealed bearing is opposed to the depth side of the spacing, so that even when a foreign matter such as mud has entered into the gap between the knuckle and the outer peripheral surface of the hub, the foreign matter can be discharged to the exterior, attendant on the rotation during running.

Further, the bearing for bearing the hub is composed of a sealed bearing, the gap between the knuckle and the outer peripheral surface of the hub is formed to have a spacing substantially constant from the depth side toward this side or to have a tapered spacing so that the gap is gradually widened along the direction from the depth side toward this side, and the seal part of the sealed bearing is opposed to the depth side of the spacing, so that even when a foreign matter such as mud has entered into the gap between the knuckle and the outer peripheral surface of the hub, the foreign matter can be discharged to the exterior, attendant on the rotation during running.

Still further, the lower end of the cushion is coaxially supported by the knuckle support part of the lower arm, so that increases in the number of component part and in weight and complication of structure can be obviated while securing a cushion stroke length.

In addition, since the knuckle support part of the lower arm is formed by bending a plate member and the knuckle and the lower end of the cushion are so supported as to be clamped between parts of the plate member, the rigidity of the knuckle support part can be secured sufficiently.

Since the knuckle support part of the lower arm is larger in width at its connection part connected to the arm part than at its knuckle and cushion lower end support part, the strength of connection between the knuckle support part and the arm part can be secured, and the rigidity of the knuckle support part can be thereby secured sufficiently.

Further, since the lower end of the cushion is located on the vehicle body front side relative to the knuckle, interference between the cushion and the drive shaft can be obviated.

Furthermore, since the width of the upper arm is smaller than the width of the lower arm and the cushion is located on the front side of the upper arm, interference between the cushion and the upper arm can be obviated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 20 shows a rear lower arm together with the configuration in the surroundings thereof;

FIG. 21(A) shows a part of the rear lower arm, as viewed from the front side, FIG. 21(B) is a plan view of the rear lower arm, and FIG. 21(C) shows the rear lower arm, as viewed from the rear side;

DETAILED DESCRIPTION OF THE PREFERRED EMBODIMENTS

In the following description, the front and rear, the left and right, the upper and lower directions refer to the directions with regard to the vehicle.

Figure 1:
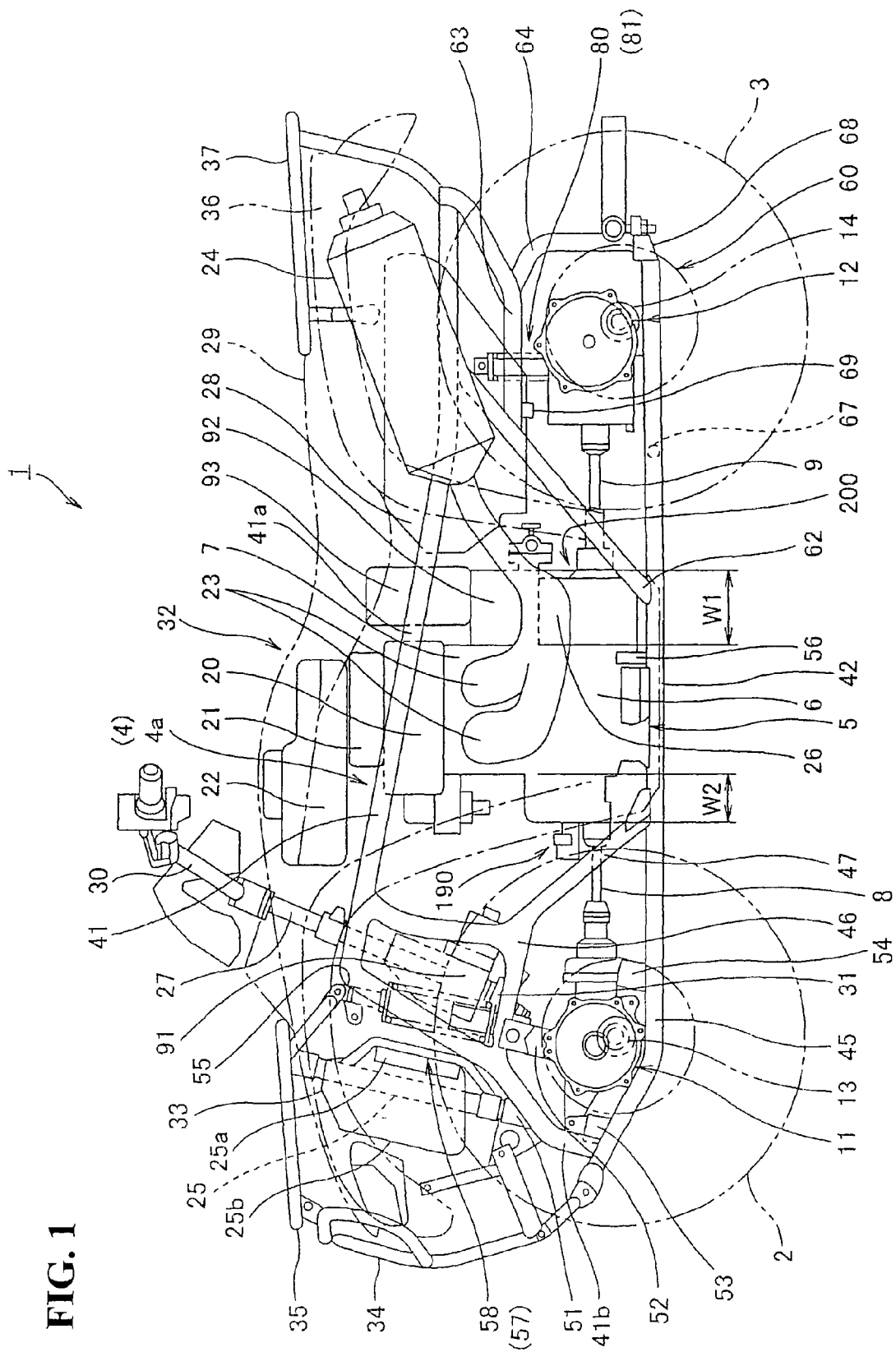
FIG. 1 is a side view of a saddle ride type vehicle to which a suspension arm structure according to the present invention has been applied.
Figure 2:
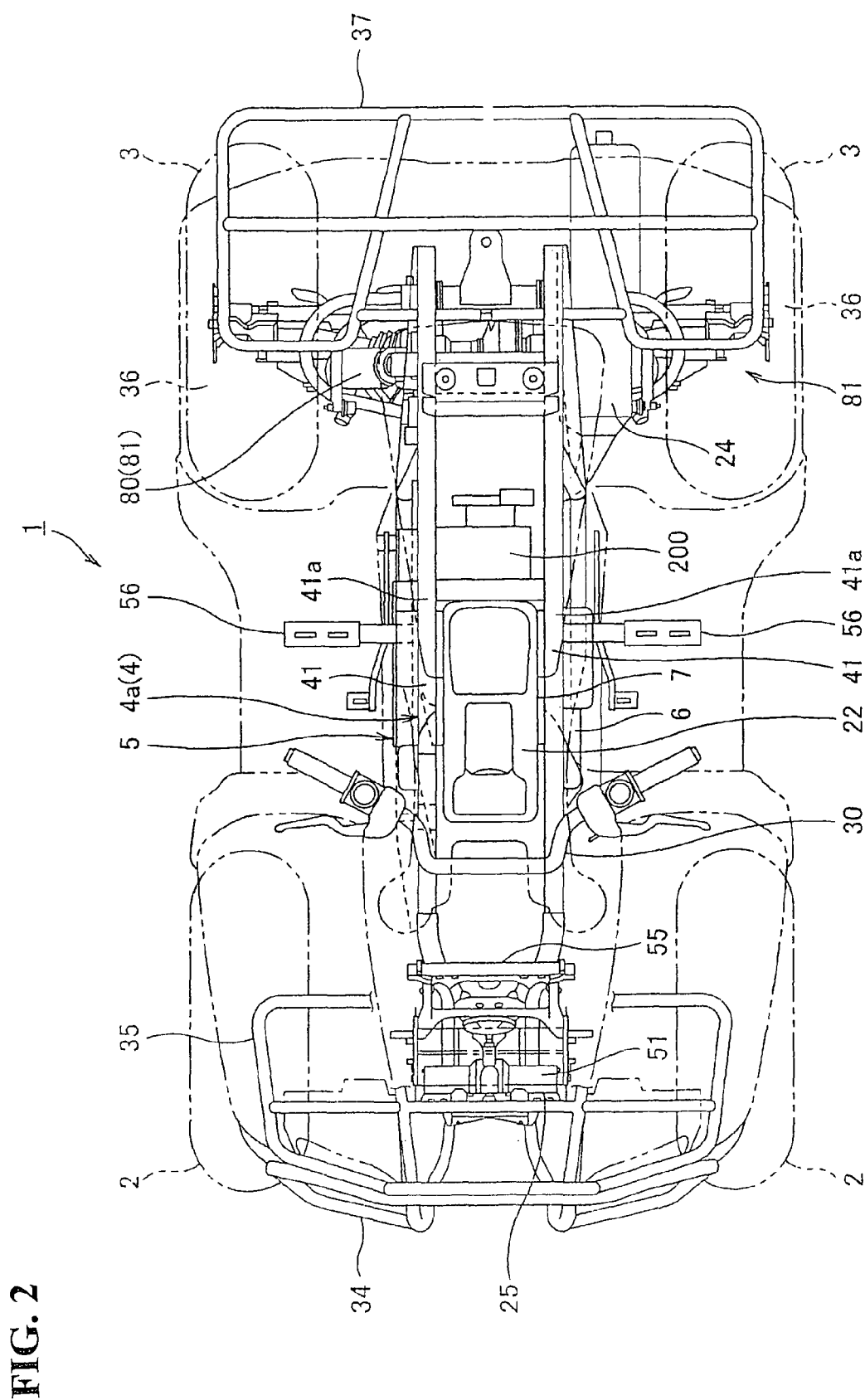
FIG. 2 is a plan view of the saddle ride type vehicle.

FIG. 1 is a side view of a saddle ride type vehicle, and FIG. 2 is a plan view of the same. The saddle ride type vehicle 1 is a four-wheel vehicle classified as ATV (All Terrain Vehicle), which is a vehicle suitable for movement in, for example, agriculture, cattle-breeding, hunting, and safety watch and for leisure, and in which left and right front wheels 2 and rear wheels 3 including comparatively large diameter low-pressure balloon tires are provided at front and rear parts of a vehicle body configured to be small in size and weight, and a large ground clearance is secured so as to enhance the running performance in an ATV mode.

The saddle ride type vehicle 1 has a vehicle body frame 4, the left and right front wheels 2 are each suspended at a front part of the vehicle body frame 4 through an independent suspension (double Wishbone) type front suspension 57, and, similarly, the left and right rear wheels 3 are each suspended at a rear part of the vehicle body frame 4 through an independent suspension (double Wishbone) type rear suspension 81.

The vehicle body frame 4 has a frame main body 4a extending substantially along the front-rear direction of the vehicle body. The frame main body 4a is formed by joining a plurality of kinds of steel members by welding or the like, wherein a left-right pair of closed loop structures are composed mainly of left and right upper pipes 41 and lower pipes 42, and the closed loop structures are coupled together through a plurality of cross members to form a box structure elongate along the front-rear direction in a central part in the vehicle width direction. The upper pipe 41 includes an upper slant part 41a extending in the vehicle body front-rear direction while being gently inclined rearwardly downward, and a front slant part 41b extending from a front end part of the upper slant part 41a toward the front lower side, whereas the lower pipe 42 is connected to the lower end of the front slant part 41b of the upper pipe 41 and extends substantially horizontally in the vehicle body front-rear direction.

Front parts of the front slant parts 41b of the upper pipes 41 and the lower pipes 42 are connected to each other by a left-right pair of front connecting slant parts 46 and a left-right pair of front sub pipes 47 which are inclined rearwardly downwards, and rear parts of the upper pipes 41 and the lower pipes 42 are connected to each other by a left-right pair of rear sub pipes 62 extending skewly upwards from the lower pipes 42 at an obtuse angle to the lower pipes 42. In addition, a left-right pair of rear cross members 63 are attached to both the rear sub pipes 62 and the upper pipes 41.

A front lower pipe 45 at a front part of the lower pipe 42 extends toward the vehicle body front side, and a front protector 34 is connected to a front end part of the front lower pipe 45; the front protector 34 functions also as a carry pipe for supporting a front carrier 35. A step bar 56 is provided at a substantially central part in the front direction of the lower pipe 42, and the step bar 56 and a step board (not shown) on the lower side thereof constitute a rider's step.

The above-mentioned left and right front slant parts 41b are joined to front end parts of the front lower pipes 45, the front slant parts 41b extend toward the rear upper side, and their upper end parts are continuous with front end parts of the upper pipes 41. A cross member 51 is bridgingly disposed between the left and right front slant parts 41b, cross members 53 and 54 spaced from each other along the front-rear direction are bridgingly disposed between the left and right front lower pipes 45, and a cross member 52 is bridgingly disposed between the left and right front connecting slant parts 46. With these cross members 51 to 54, frame rigidity around the front part of the vehicle body is secured sufficiently, and the cross members 52, 53 and 54 and the like serve also as support members for supporting a front wheel side final speed reduction gear 11.

On the left and right parts of the cross member 55 bridgingly disposed between the front slant parts 41b, as shown in FIG. 1, the upper ends of a left-right pair of front cushion units 58 are supported through brackets (not shown), and the front wheels 2 are suspended by a left-right pair of front suspensions 57 inclusive of the front cushion units 58.

Front upper arms (not shown) and front lower arms (not shown) constituting a left-right pair of front suspension arms are vertically swingably supported on the cross members 51 to 54. More specifically, front and rear parts on the base end side of the front upper arms (not shown) are vertically swingably supported on the cross members 51 and 52 located on the upper side, and front and rear parts on the base end side of the front lower arms (not shown) are vertically swingably supported on the cross members 53 and 54 located on the lower side. Upper and lower parts of a left-right pair of knuckles (not shown) are vertically swingably supported on the tip side of the left and right upper arms and lower arms, hubs of the left and right front wheels 2 are rotatably supported on the knuckles, the upper ends of a left-right pair of front cushion units 58 are supported between the left and right lower arms and the cross member 55, and these members constitute the front suspensions 57 for suspending the front wheels 2.

Rear parts of the lower pipes 42 and the rear cross members 63 are connected to each other by a left-right pair of rear members 64 extending vertically, a left-right pair of closed loop structures are composed mainly of the lower pipes 42, the rear sub pipes 62, the rear cross members 63 and the rear members 64, and the closed loop structures constitute a box structure 60 for supporting a rear wheel side final speed reduction gear 12. A cross member 69 is bridgingly disposed between the rear cross members 63, a cross member 67 is bridgingly disposed between rear parts of the lower pipes 42, and a cross member 68 is bridgingly disposed between the vicinities of lower end parts of the rear members 64. With these cross members 67 to 69, frame rigidity around the rear part of the vehicle body is secured sufficiently.

Figure 3:
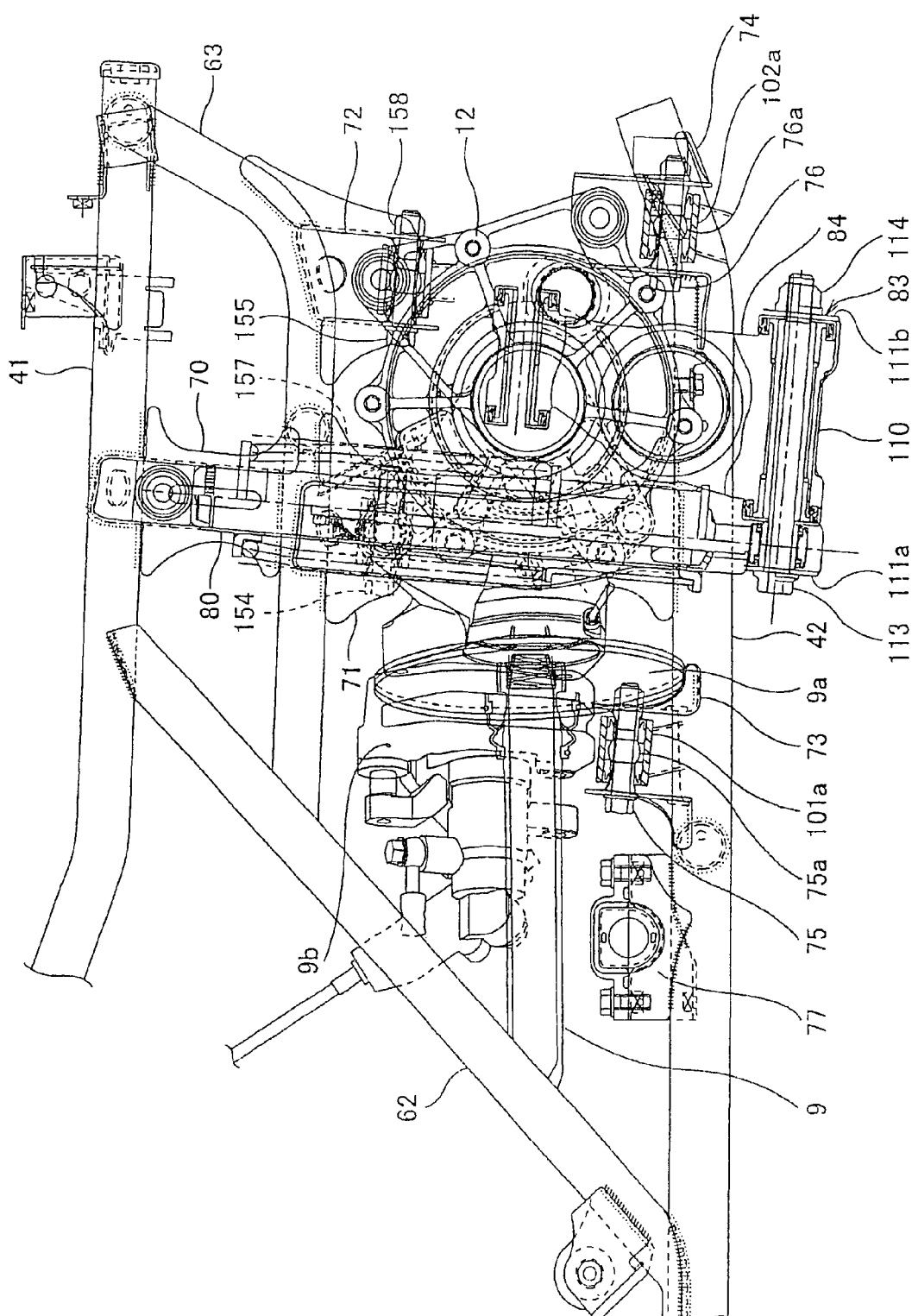
FIG. 3 is a side view of a rear part of the saddle ride type vehicle.

As shown in FIG. 3, upper parts of a left-right pair of rear cushion units 80 are supported between the upper pipes 41 and the rear cross members 63 through brackets 70, and a left-right pair of rear suspensions 81 including the rear cushion units 80 are configured on the left and right sides of the box structure 60.

As shown in FIG. 3, upper parts of a left-right pair of rear cushion units (cushions) 80 are supported between the upper pipes 41 and the rear cross members 63 through brackets 70, and a left-right pair of rear suspensions 81 including the rear cushion units 80 are configured on the left and right sides of the box structure 60.

In this configuration, as shown in FIGS. 1 and 2, an engine 5 as a prime mover composed of a water-cooled type two-cylinder engine, for example, is mounted substantially at the center of the vehicle body frame 4. The engine 5 includes a crankcase 6 rotatably supporting a crankshaft and the like, and a cylinder part 7 connected to the upper side of the crankcase 6, and a so-called longitudinal layout is adopted in which the rotational axis of the crankshaft is set along the vehicle front-rear direction. The crankcase 6 serves also as a transmission case for accommodating a transmission, and propeller shafts 8 and 9 for the front wheels and the rear wheels, which shafts are connected to the transmission inside the crankcase 6, are led out respectively forwards and rearwards from front and rear parts of the crankcase 6.

On the lower side of a front part and on the lower side of a rear part of the vehicle body frame 4, the propeller shafts 8 and 9 are connected respectively to the front wheels 2 and the rear wheels 3 through the front wheel side final speed reduction gear 11 and the rear wheel side final speed reduction gear 12, drive shafts 13, 14 extending to the left and right sides of the final speed reduction gears 11, 12 and the like so that power can be transmitted to the front and rear wheels 2, 3. The rotational power supplied from the engine 5 is transmitted through the transmission in the crankcase 6 to the propeller shafts 8, 9, and then through the final speed reduction gears 11, 12 and the drive shafts 13, 14 to the front wheels 2 and the rear heels 3.

A cylinder head part 20 is connected to an upper part of the cylinder part 7 of the engine 5, and a throttle body 21 is provided on the upper side of the cylinder head part 20. Further, an air cleaner case 22 is connected to the throttle body 21, and these members constitute an intake system for the engine 5. Two exhaust pipes 23, corresponding to the two cylinders of the engine 5, are connected to one side (left side surface part) of the cylinder head part 20 of the engine 5. These exhaust pipes 23 extend leftwards from the left side surface part of the cylinder part 7, are bent to extend toward the rear side of the engine, then join each other in a joining pipe 26 located on the left side of the boundary part between the crankcase 6 and the cylinder part 7, the joined exhaust pipe extends rearwards from the joining pipe 26, and is connected to a silencer 24 disposed on the left side of a rear part of the vehicle body in the state of being inclined rearwardly upwards, these members constituting an exhaust system for the engine 5.

In the center in the vehicle width direction of the vehicle body frame 4, as shown in FIGS. 1 and 2, a radiator 25 for cooling the engine 5, a blowing fan 25a, a shroud 25b, the front cushion units 58, a steering shaft 27, the air cleaner case 22, the throttle body 21, a saddle ride type seat 29 and a fuel tank 28 are laid out in this order from the vehicle body front side. A bar type handle 30 located on the skew upper side of the air cleaner case 22 is attached to an upper end part of the steering shaft 27, whereas a motor-driven power steering mechanism 91 and a front wheel steering mechanism 31 are connected to a lower end part of the steering shaft 27.

A resin-made vehicle body cover 32 for covering a vehicle body front part inclusive of the air cleaner case 22 and the throttle body 21 from the upper side, a resin-made front fender 33 for covering the front wheels 2 over the range from the upper side to the rear side of the latter, and a front protector 34 and the front carrier 35 which are composed mainly of steel members, are provided at a front part of the vehicle body frame 4. In addition, a resin-made rear fender 36 for covering the rear wheels 3 over the range from the front side to the upper side of the latter, and a rear carrier 37 composed mainly of steel members, are provided at a rear part of the vehicle body frame 4.

In this configuration, the engine 5 is located between the front wheels 2 and the rear wheels 3 which are suspended from the frame 4 so that, especially, the center of the cylinder part 7 of the engine 5 (roughly the center between the cylinders) is located near the front wheels 2. In the saddle ride type vehicle, when the position of the seat 29 is determined, the layout of the engine 5 is determined accordingly. This is because a seating part of the seat 29 is low and the engine 5 is disposed on the front side relative to the seating part.

The engine 5 includes the crankcase 6, and the cylinder part 7 bulging upwards from the crankcase 6. The crankshaft of the longitudinal layout type, i.e., extending in the vehicle body front-rear direction is provided in the crankcase 6, an ACG (AC generator) 190 is connected to the front end of the crankshaft, and power transmission system members 200 inclusive of a torque converter and the like are connected to the rear end of the crankshaft. In other words, the engine 5 is disposed with the ACG 190 directed toward the vehicle body front side and with the power transmission system members 200 directed toward the vehicle body rear side. In addition, the front wheel side final speed reduction gear 11 is located on the front side of the engine 5, the rear wheel side final speed reduction gear 12 is located on the rear side of the engine 5, and the distance from the engine 5 to the rear wheel side final speed reduction gear 12 is set longer than the distance from the engine 5 to the front wheel side final speed reduction gear 11.

The ACG 190 and the power transmission system members 200 are bulging from the cylinder part 7 in the engine front-rear direction, and the rearward bulging width W1 of the power transmission system members 200 is greater than the forward bulging width W2 of the ACG 190. An oil tank 92 for reserving an engine oil is provided at an upper part of the power transmission system members 200 bulging rearwards, and a battery 93 is disposed at an upper part of the oil tank 92.

As shown in FIG. 3, a brake caliper 9b for pressing a pad against a brake disk 9a coaxially fixed to the propeller shaft 9 for driving the rear wheels 3 is supported on the front side of the rear wheel side final speed reduction gear 12. Incidentally, in FIG. 3, symbols 71 and 72 denote upper arm support parts for supporting rear upper aims 82 (described later) of the rear suspensions 81, while symbols 73 and 74 denotes lower arm support parts for supporting rear lower arms 83 (described later) of the rear suspensions 81, and symbol 74 denotes a stabilizer support part for supporting a rear stabilizer (not shown).

Figure 4:
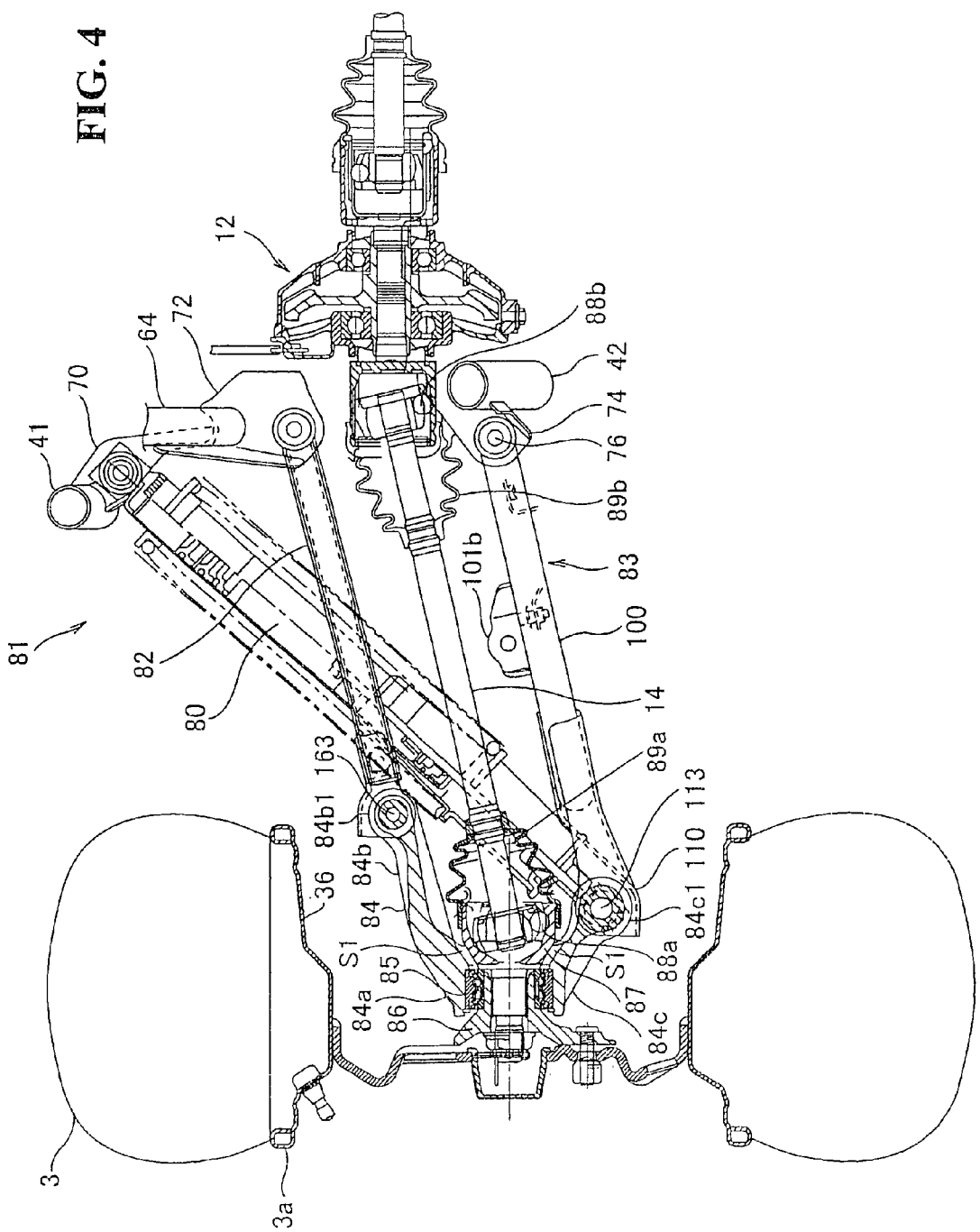
FIG. 4 shows a rear suspension together with the configuration in the surroundings thereof.

FIG. 4 shows the rear suspension 81. Since the left and right rear suspensions 81 are structured to be symmetrical on the left and right sides, the rear suspension 81 for suspending the rear wheel 3 on one side will be described below.

The rear suspension 81 includes a rear upper arm 82 and a rear lower arm 83 constituting a rear suspension arm. A base end part of the rear upper arm 82 is vertically swingably supported on the vehicle body frame 4 through upper arm support parts 71, 72 shown in FIG. 3, and a base end part of the rear lower arm 82 is vertically swingably supported on the vehicle body frame 4 through lower arm support parts 73, 74 shown in FIG. 3.

A knuckle 84 is connected to the tips of the rear upper arm 82 and the rear lower arm 83, a hub 86 is rotatably supported on the knuckle 84 through a bearing 85, and the wheel element 3a of the rear wheel 3 is connected to the outer side (the vehicle body outer side) of the hub 86. The tip of the rear cushion unit 80 is connected to the rear lower arm 83, and by these members the rear wheel 3 is independently suspended swingably. A sealed bearing is used as the bearing 85 for bearing the hub 86, whereby a seal between the knuckle 84 and the wheel element 3a of the rear wheel 3 and a seal between the knuckle 84 and an axle 87 (described below) are unnecessary.

The axle 87 to which the drive shaft 14 is connected through a universal joint 88a is provided on the inner side (the vehicle body inner side) of the hub 86, and by these members, the power of the engine 5 is transmitted from the rear wheel side final speed reduction gear 12 to the axle 87 and the hub 86 through the drive shaft 14, whereby the rear wheel 3 is driven to rotate. The drive shaft 14 is connected to the rear wheel side final speed reduction gear 12 also through a universal joint 88b. These universal joints 88a, 88b are composed of equal-speed joints such as to equalize the speed on the input side (on the side of the rear wheel side final speed reduction gear 12) and the speed on the output side (the rear wheel 3 side).

The connected parts between the universal joints 88a, 88b at both end parts of the drive shaft 14 and the drive shaft 14 are covered with rubber- or resin-made boots 89a, 89b, respectively. The boot 89a on the rear wheel 3 side protrudes to the vehicle body inner side relative to the rim 3b of the wheel element 3a so as to cover the universal joint 88a and a tip part of the drive shaft 14, and the boot 89b on the side of the rear wheel side final speed reduction gear 12 protrudes to the vehicle body outer side relative to the lower pipe 42 so as to cover the universal joint 88b and a base end part of the drive shaft 14.

Figure 5:
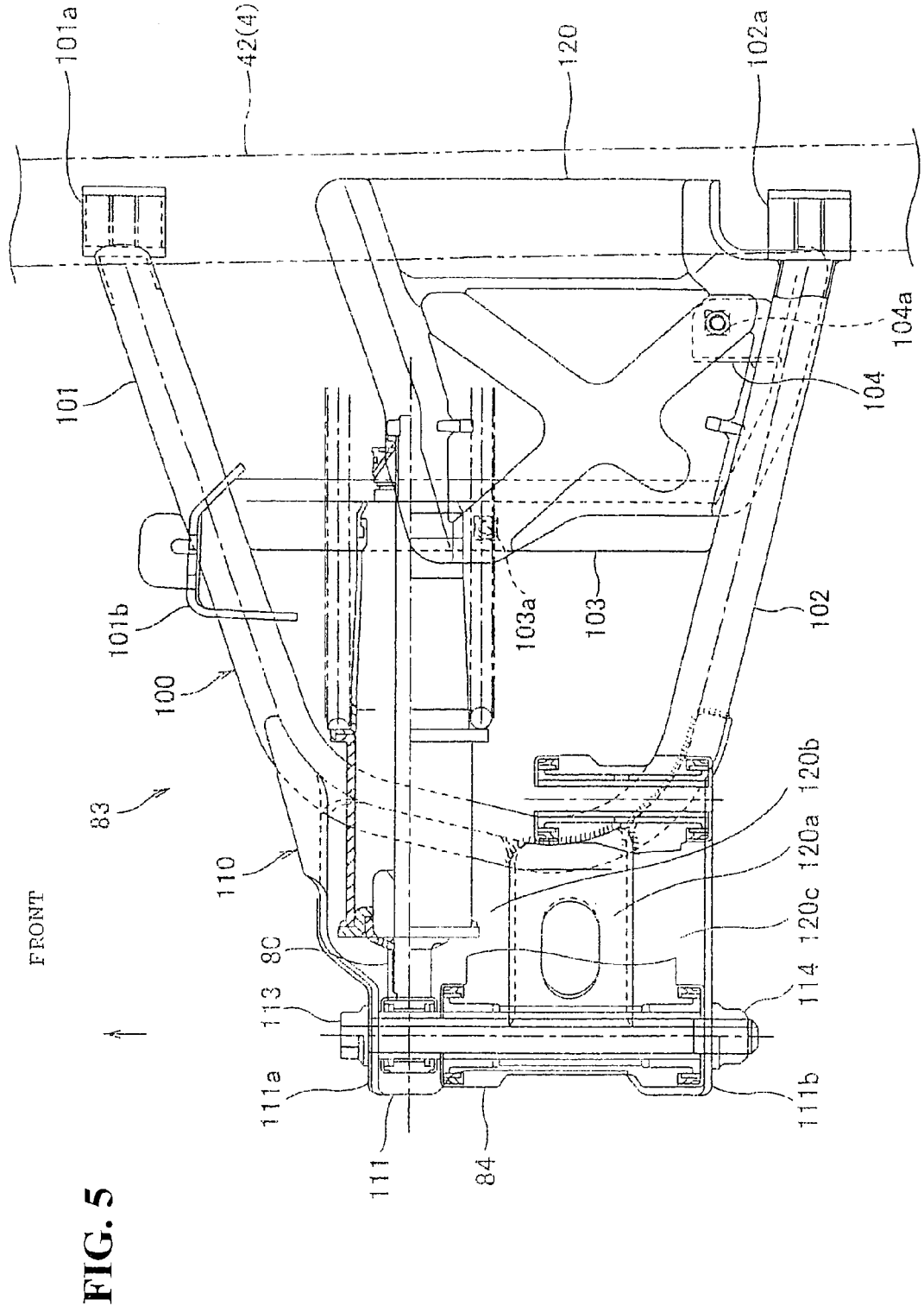
FIG. 5 shows a rear lower arm together with the configuration in the surroundings thereof.

FIGS. 5 and 6 show the rear lower arm 83. The rear lower arm 83 includes a bent pipe 100 which is a pipe member bent in a roughly U shape, and a knuckle support part (also called pivot part) 110 for supporting the knuckle part 84.

Figures 6A, 6B, 6C:
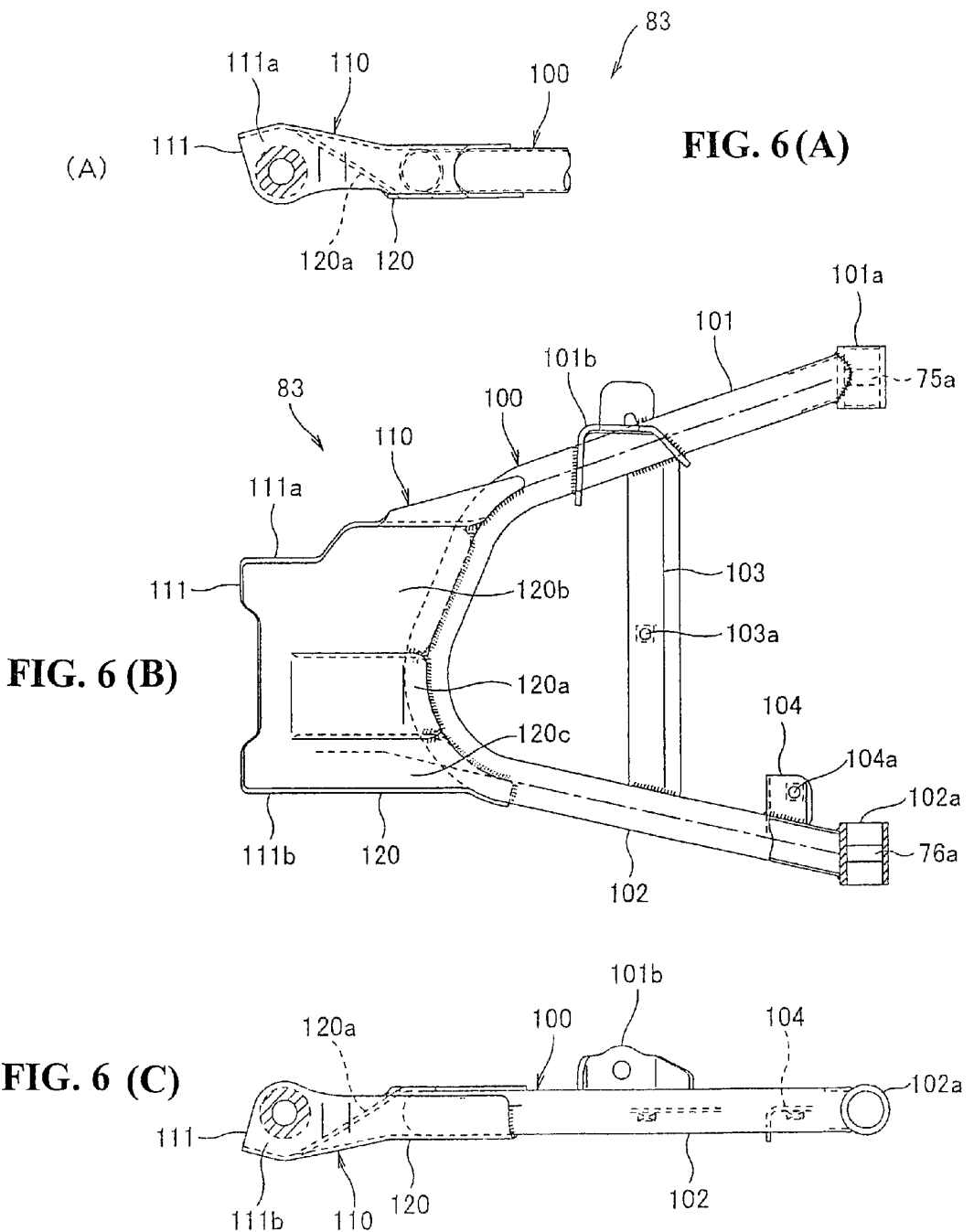
FIG. 6(A) shows a part of the rear lower arm, as viewed from the front side.
FIG. 6(B) is a plan view of the rear lower arm.
FIG. 6(C) shows the rear lower arm, as viewed from the rear side.

The bent pipe 100, as shown in FIG. 6(B), includes a front arm 101, a rear arm 102 disposed on the rear side of the front arm 101, and a cross member 103 bridgingly disposed between the front arm 101 and the rear arm 102. Bolt passing parts 101a, 102a provided therein with through-holes substantially in the vehicle body front-rear direction are attached respectively to end parts of the front arm 101 and the rear arm 102, and the bolt passing holes 101a, 102a are connected to the lower arm support parts 72, 73 through long-shaft bolts 75, 76, as shown in FIG. 3. Here, shaft parts of the long-shaft bolts 75, 76 are provided respectively with bulging parts 75a, 76a, and the bulging parts 75a, 76a are supported by the lower arm support parts 72, 73, whereby the rear lower arm 83 is so supported that it is inclinable in the front-rear direction and is vertically swingable, with the axis of the long-shaft bolts 75, 76 as a center.

An arm-side stabilizer support part 101b for supporting the stabilizer together with a stabilizer support part 79 provided at the lower pipe 42 is attached to the front arm 101, and, when the left and right rear wheels 3 are moved in vertical reverse phases, the stabilizer restrains the motion of the rear lower arm 83, whereby inclination (rolling) of the vehicle body can be restrained.

Figure 7:
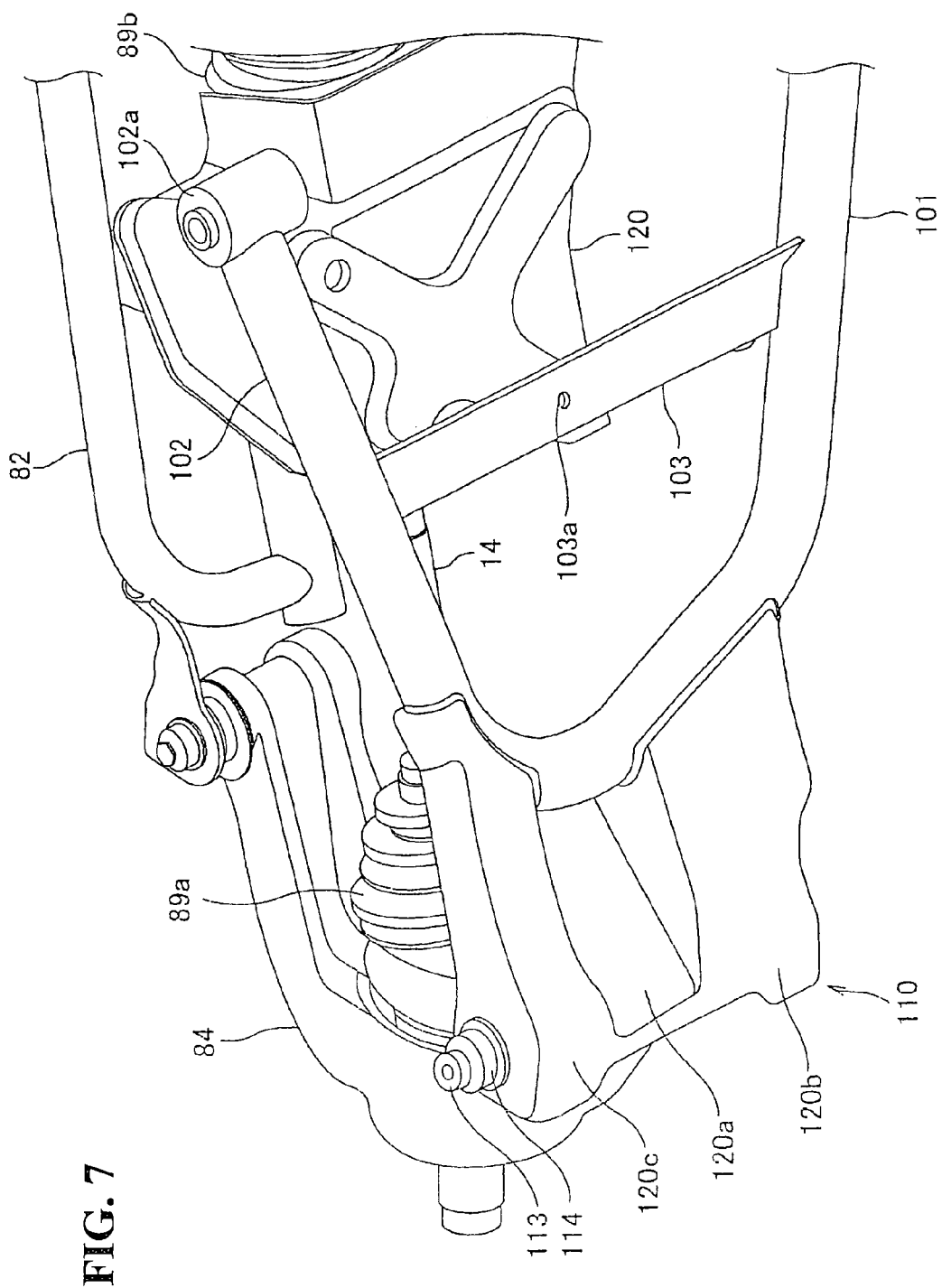
FIG. 7 is a perspective view showing the rear lower arm together with the configuration in the surroundings thereof.

A bracket 104 is attached to the rear arm 102, the bracket 104 and the cross member 103 are provided with bolt holes 104a, 103a, respectively, and an inboard-side boot cover 120 (see FIG. 5) is attached by bolts and nuts through the bolt holes 104a, 103a. As shown in FIG. 7, the inboard-side boot cover 120 is a resin-made plate member for covering the boot 89b on the base end part side of the drive shaft 14 from the lower side, and protects the boot 89b, the universal joint 88b in the boot 89b, and the like against stones flying from the vehicle body front side or the lower side and against obstacles.

As shown in FIGS. 6(A) to 6(C), the knuckle support part 110 is composed of a press-formed metallic plate member, and its base end part is joined to a tip part of the bent pipe 100 by welding or the like. A tip part 111 of the knuckle support part 110 is formed in a roughly angular U-shaped cross-sectional shape opened to the upper side, with a spacing in the vehicle body front-rear direction, as shown in FIG. 7. Between side walls 111a, 111b thus spaced in the vehicle body front-rear direction, a lower end part of the knuckle 84 and a lower end part of the rear cushion unit 80 are disposed side by side in the vehicle body front-rear direction. The lower end parts of the knuckle 84 and the rear cushion unit 80 are connected to the knuckle support part 110 through a long-shaft bolt 113 penetrating the side walls 111a, 111b, and the long-shaft bolt 113 is fixed to the knuckle support part 110 by a nut 114.

A base end part 120 of the knuckle support part 110 is formed in a centrally projected sectional shape in which a substantially central part 120a in the vehicle body width direction is raised upward as one goes from a tip part 111 toward the vehicle body center side. Of the knuckle support part 110, a base end part of the central part 120a is welded to the upper side of the bent pipe 100, and front and rear parts 120b and 120c on opposite sides of the central part 120a are welded to the lower side of the bent pipe 100. As a result, the base end part 120 of the knuckle support part 110 is joined to the bent pipe 100 in the state of clamping the bent pipe 100 from the upper and lower sides, whereby the knuckle support part 110 and the bent pipe 100 can be joined with high strength. In addition, since the knuckle support part 110 is formed in a sectional shape having a recessed part and a projected part, its modulus of section is high, and the rigidity of the knuckle support part 110 can be secured sufficiently.

When the rear wheel 3 is connected to the hub 86 supported by the knuckle 84, the knuckle support part 110 extends between the rim 3b of the wheel element 3a and the bent pipe 100, as shown in FIG. 4, and it covers the lower side of the boot 89a on the tip end part side of the drive shaft 14 and the lower side of a lower end part of the rear cushion unit 80, as shown in FIG. 7. Therefore, the knuckle support part 110 can not only function as a component part of the rear lower arm 83 but also function as an outboard-side boot cover for protecting the boot 89a as well as the universal joint 88b in the boot 89b and the rear cushion unit 80 against stones flying from the vehicle body front side or the lower side and against obstacles.

Thus, the knuckle support part 110 of the rear lower arm 83 (rear suspension arm) is composed of a plate member extended on the vehicle body inner side relative to the rim 3b of the wheel element 3a so as to cover the lower side of the boot 89a, so that the boot 89a can be protected without separately providing an outboard-side boot cover for covering the boot 89a from the lower side. Therefore, as compared with the case of providing a separate outboard-side boot cover, increases in the number of component parts and in weight can be suppressed; in addition, since it is unnecessary to secure a space for attaching an outboard-side boot cover or to provide a bracket for attaching this boot cover, complication of the structure of the rear lower arm 83 can be obviated.

Moreover, since the knuckle support part 110 has a configuration wherein the knuckle 84 and a lower end part of the rear cushion unit 80 are supported through a common shaft member (long-shaft bolt 113), it is unnecessary to separately provide a shaft member for the rear cushion unit 80, which also can suppress the increases in the number of component parts and in weight. Besides, since the knuckle support part 110 covers also the lower side of a lower end part of the rear cushion unit 80 interposed between the rear lower arm 83 and the vehicle body frame 4, the rear cushion unit 80 can also be protected.

Figure 8:
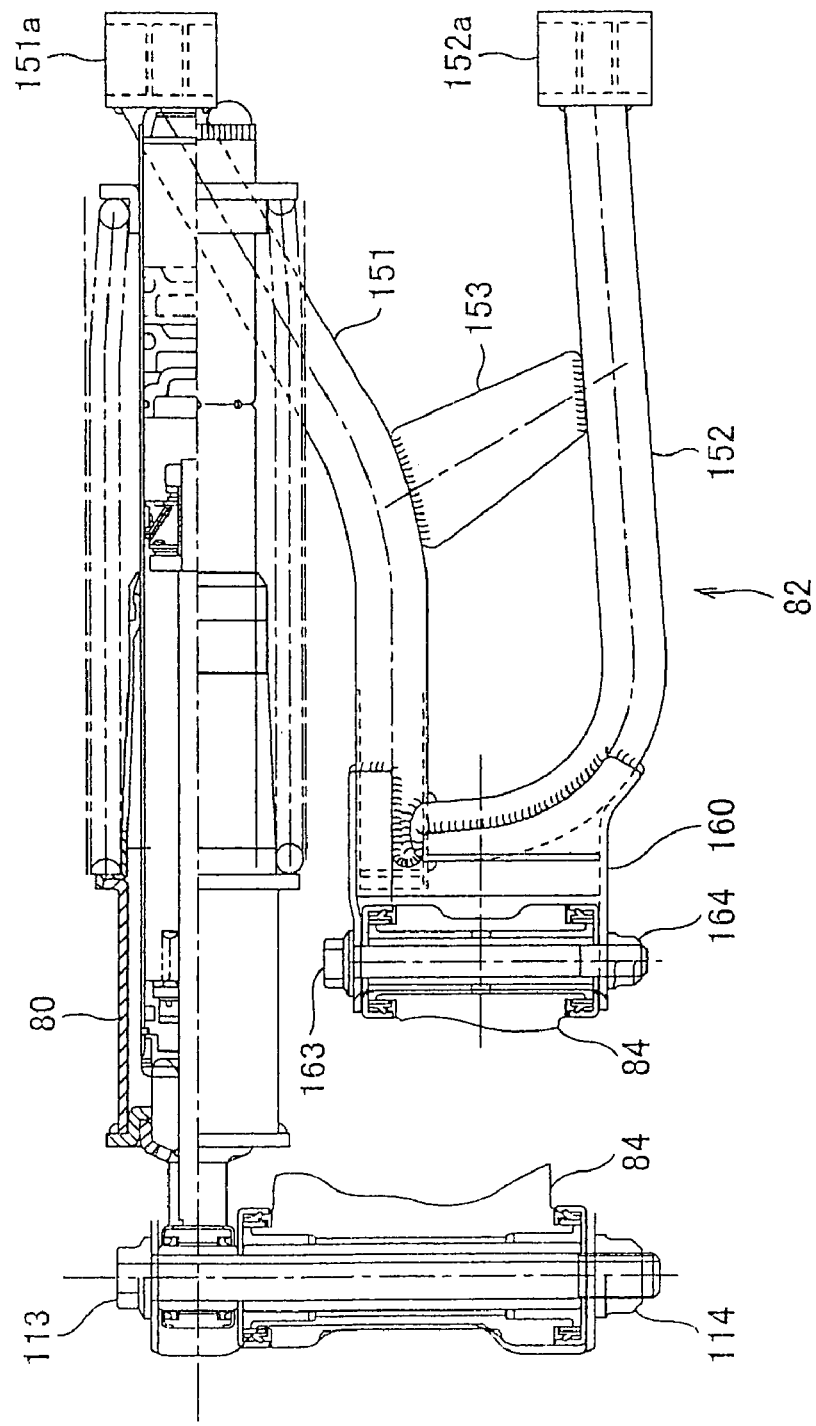
FIG. 8 shows a rear upper aim together with the configuration in the surroundings thereof.

FIG. 8 shows the rear upper arm 82. The rear upper arm 82 includes a front arm 151 and a rear arm 152 which are composed of pipe members, a cross member 153 bridgingly disposed between the front arm 151 and the rear arm 152, and a knuckle support part (also called pivot part) 160 for supporting an upper end part of the knuckle 84.

Bolt passing parts 151a, 152a provided therein with through-holes substantially in the vehicle body front-rear direction are attached respectively to end parts of the front arm 151 and the rear arm 152, and the bolt passing parts 151a, 152a are respectively connected to upper arm support parts 71, 72 (see FIG. 3) through long-shaft bolts 154, 155 and nuts 157, 158 which are shown in FIG. 3.

The knuckle support part 160 is composed of a metallic plate member having a roughly angular U-shaped cross sectional shape opened to the lower side, its base end part is joined to tip parts of the front arm 151 and the rear arm 152 by welding or the like, an upper end part of the knuckle 84 is turnably connected through a long-shaft bolt 163, and the long-shaft bolt 163 is fixed to the knuckle support part 160 by a nut 164.

Figure 9B:
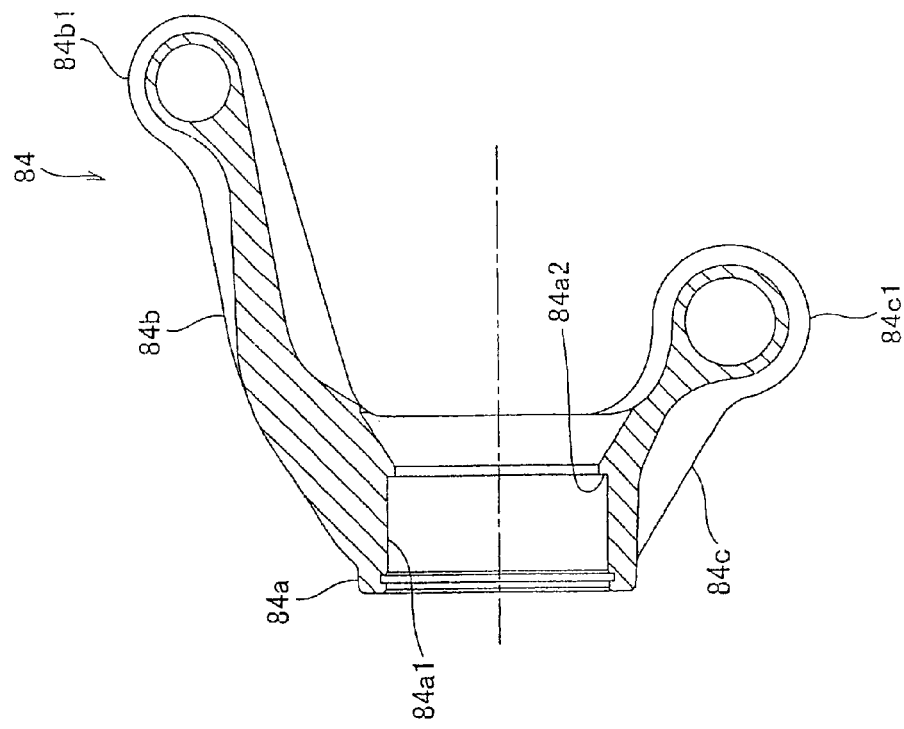
FIG. 9(B) shows a longitudinal section (Y1-Y1 section) of FIG. 9(A)
Figure 9A:
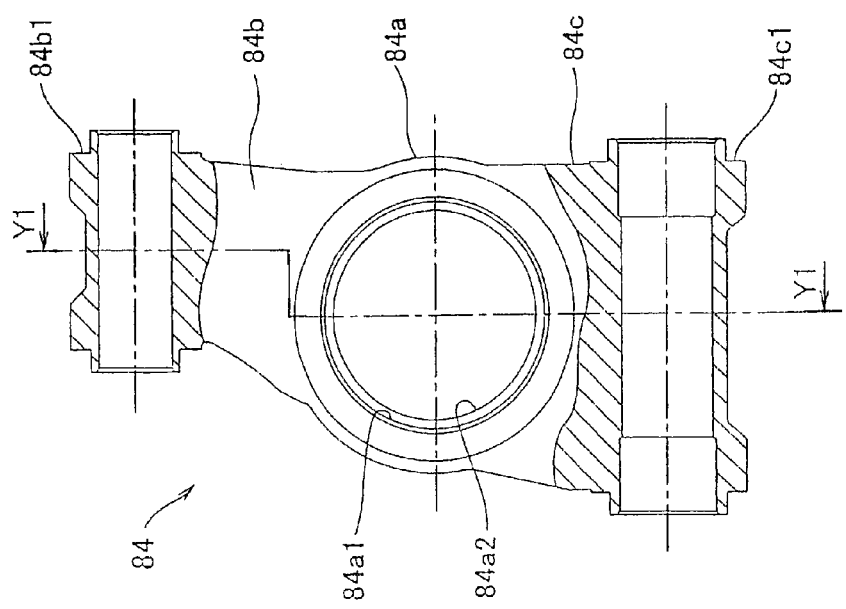
FIG. 9(A) shows a knuckle on the rear side.

FIG. 9(A) shows the knuckle 84 on the rear side, and FIG. 9(B) shows a longitudinal section (Y1-Y1 section) of FIG. 9(A). The knuckle 84 integrally includes a knuckle main body 84a for rotatably supporting the hub 86, an upper arm connection part 84b connected to the rear upper arm 82, and a lower arm connection part 84c connected to the rear lower arm 83. The knuckle main body 84a is provided with an insertion hole 84a1 in which to insert the bearing 85 (see FIG. 4), and the insertion hole 84a1 is provided at its depth part with an inward projected part 84a2 with which an outer ring of the bearing 85 comes into contact, whereby the bearing 85 is positioned.

The upper arm connection part 84b extends skewly upwards from an upper part of the knuckle main body 84a1, and a bolt passing part 84b1 provided at its end part is turnably connected to the rear upper arm 82 through a long-shaft bolt 163 (see FIG. 8). In addition, the lower arm connection part 84c extends skewly upwards from a lower part of the knuckle main body 84a1, and a bolt passing part 84c1 provided at its end part is turnably connected to the rear upper arm 82 through a long-shaft holt 113 (see FIG. 5).

Figure 10:
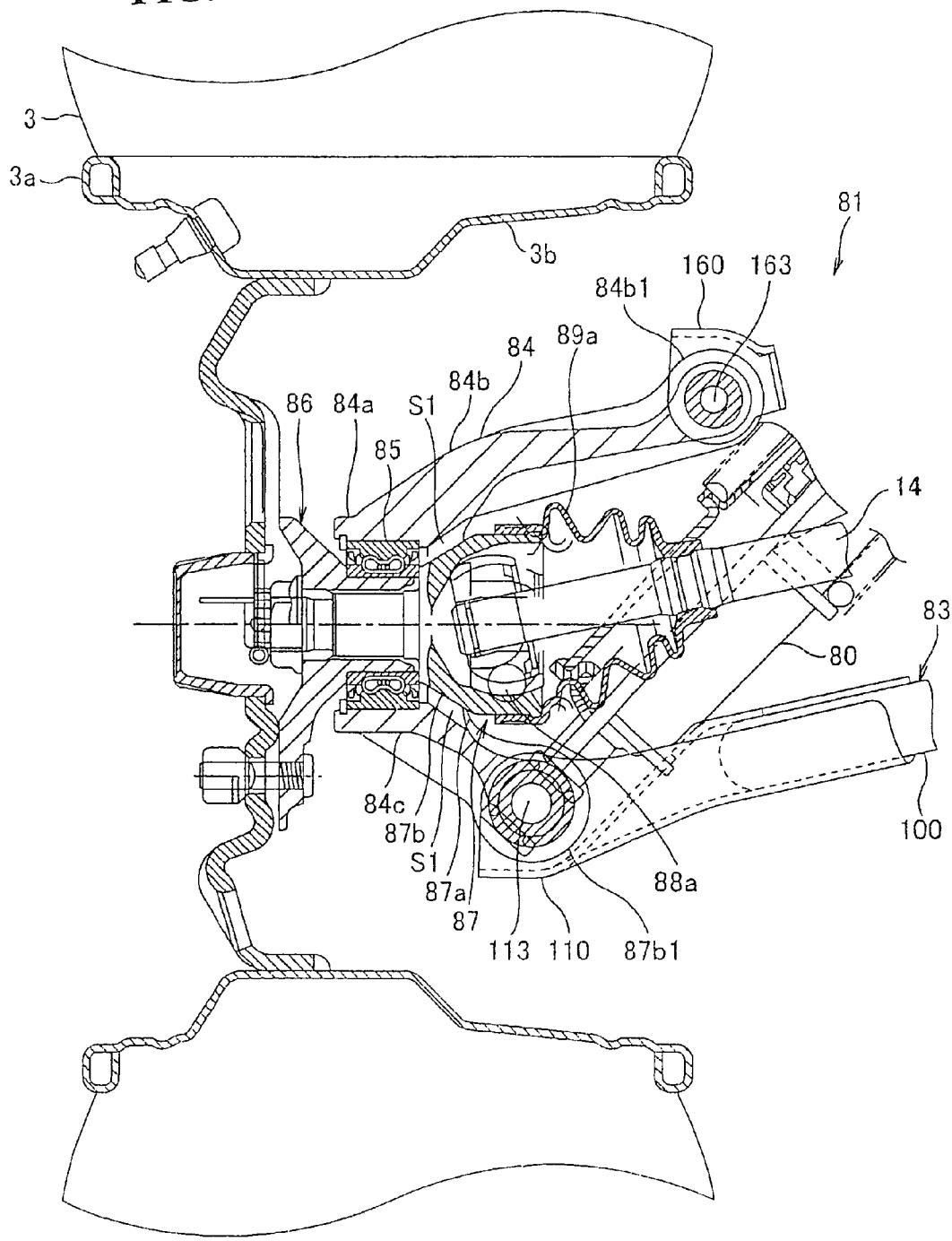
FIG. 10 is an enlarged view of a part of the rear suspension.

As shown in FIG. 10, the axle 87 connected to the hub 86 supported on the knuckle main body 84a1 is located between the upper arm connection part 84b and the lower arm connection part 84c, and the knuckle 84, the hub 86 and the axle 87 can be moved as one body, with a connection start point (the axis of the long-shaft bolts 113, 163) as a reference.

In this configuration, as shown in FIG. 10, the axle 87 has a large-diameter part 87a larger in diameter than a shaft part (the shaft part borne by the bearing 85) of the hub 86, a base end part of the large-diameter part 87a is formed as a tapered part 87b gradually increased in diameter as one goes away from the hub 86, and the upper arm connection part 84b and the lower arm connection part 84c of the knuckle 84 are formed in such shapes that the gap S1 between the connection part and the tapered part 87b is substantially constant from the depth side toward this side (the vehicle body center side).

Figure 11:
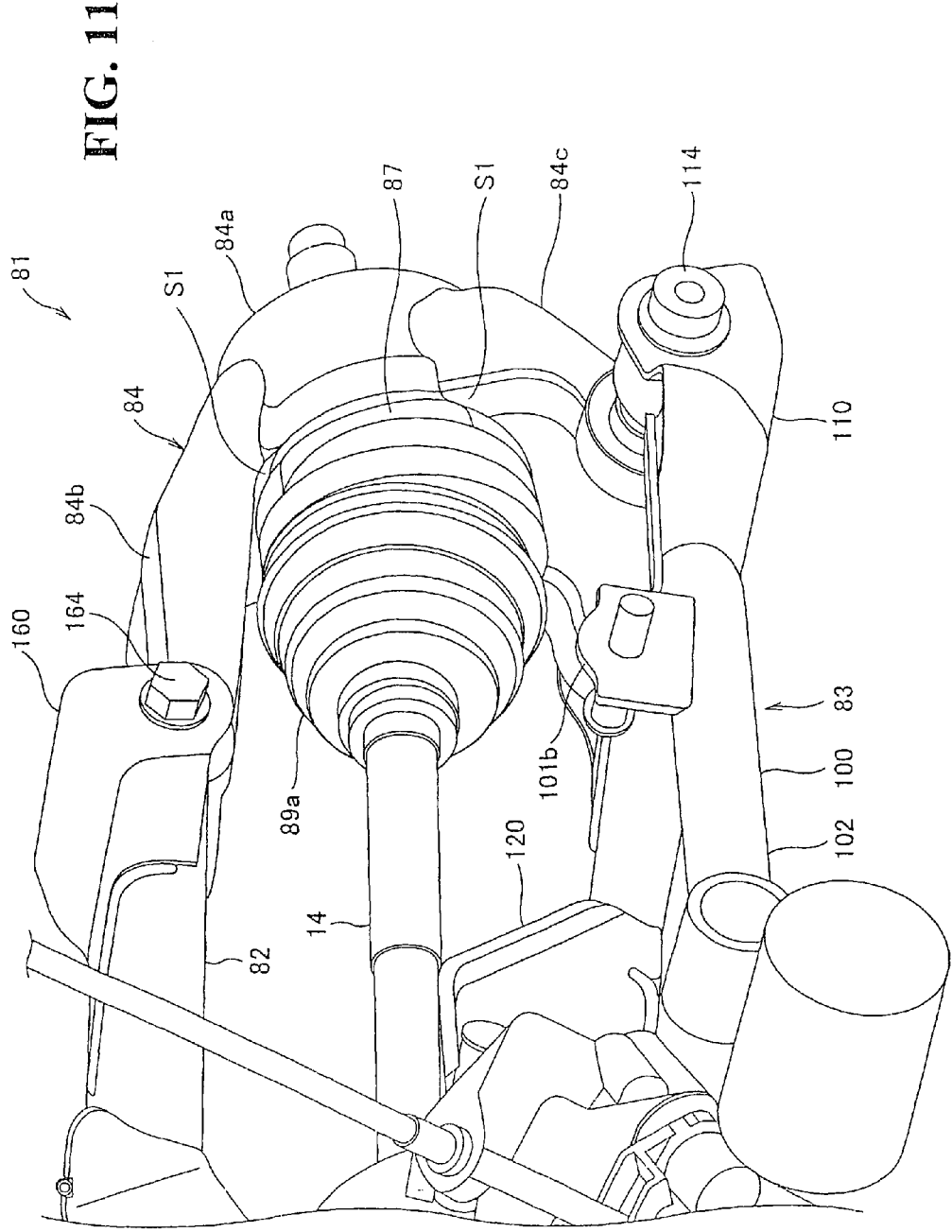
FIG. 11 is a perspective view of the rear suspension.

More specifically, base end parts of the upper arm connection part 84b and the lower aim connection part 84c extend respectively skewly upward and skewly downward along the tapered part 87b of the axle 87 to be substantially the same in length as the tapered part 87b, and then, as shown in FIG. 11, they are smoothly bent substantially along the outer peripheries of the axle 87 and the boot 89a, to be connected to the rear upper arm 82 and the rear lower arm 83, respectively.

As a result, the parts extending in tapered shapes (hereinafter referred to as the tapered extension parts) of the upper arm connection part 84b and the lower arm connection part 84c are formed to be substantially the same in length as the tapered part 87b of the axle 87, and the gap S1 between the knuckle 84 and the outer peripheral surface of the axle 87 is formed to have a substantially constant spacing.

Therefore, even when a foreign matter such as mud and soil has entered into the gap S1 between the knuckle 84 and the axle 87 during ATV mode running, the foreign matter having entered between the upper arm connection part 84b and the axle 87 can be easily discharged to the exterior by the centrifugal force generated attendant on the rotation of the axle 87 during the running, and the foreign matter having entered between the lower arm connection part 84c and the axle 87 can also be easily discharged to the exterior by the centrifugal force and gravity, since the gap S1 has a substantially constant spacing. Further, since a seal part of the bearing 85 is disposed opposite to the depth side of the gap S1, penetration of foreign matter into the bearing 85 can be prevented more securely.

In addition, since the knuckle 84 has the tapered extension part extending along the tapered part 87b of the axle 87 and the tapered extension part is formed to be substantially the same in length as the tapered part 87b, no step is present in the gap S1 between the knuckle 84 and the axle 87, so that foreign matter such as mud will hardly be caught in the gap S1.

Besides, since the surface, covering the axle 87, of the knuckle 84 (the inner periphery side surface of the tapered extension part) is formed as a tapered surface inclined to the outer periphery side toward a foreign matter entrance (an opening on the vehicle body center side), the foreign matter having entered into the gap S1 can be more easily discharged along the tapered surface to the exterior when being moved in the centrifugal direction attendant on the rotation of the axle 87.

Incidentally, in this embodiment, the knuckle support part 110 of the rear lower arm 83 is composed of a plate member covering the lower side of the boot 89a, so that foreign matters coming from the lower side of the vehicle body can be blocked by the knuckle support part 110, and penetration of foreign matter into the gap S1 between the knuckle 84 and the axle 87 can be restrained more assuredly. Therefore, the situation in which foreign matter is caught in the gap S1 can be securely obviated by these features in configuration.

Figure 12:
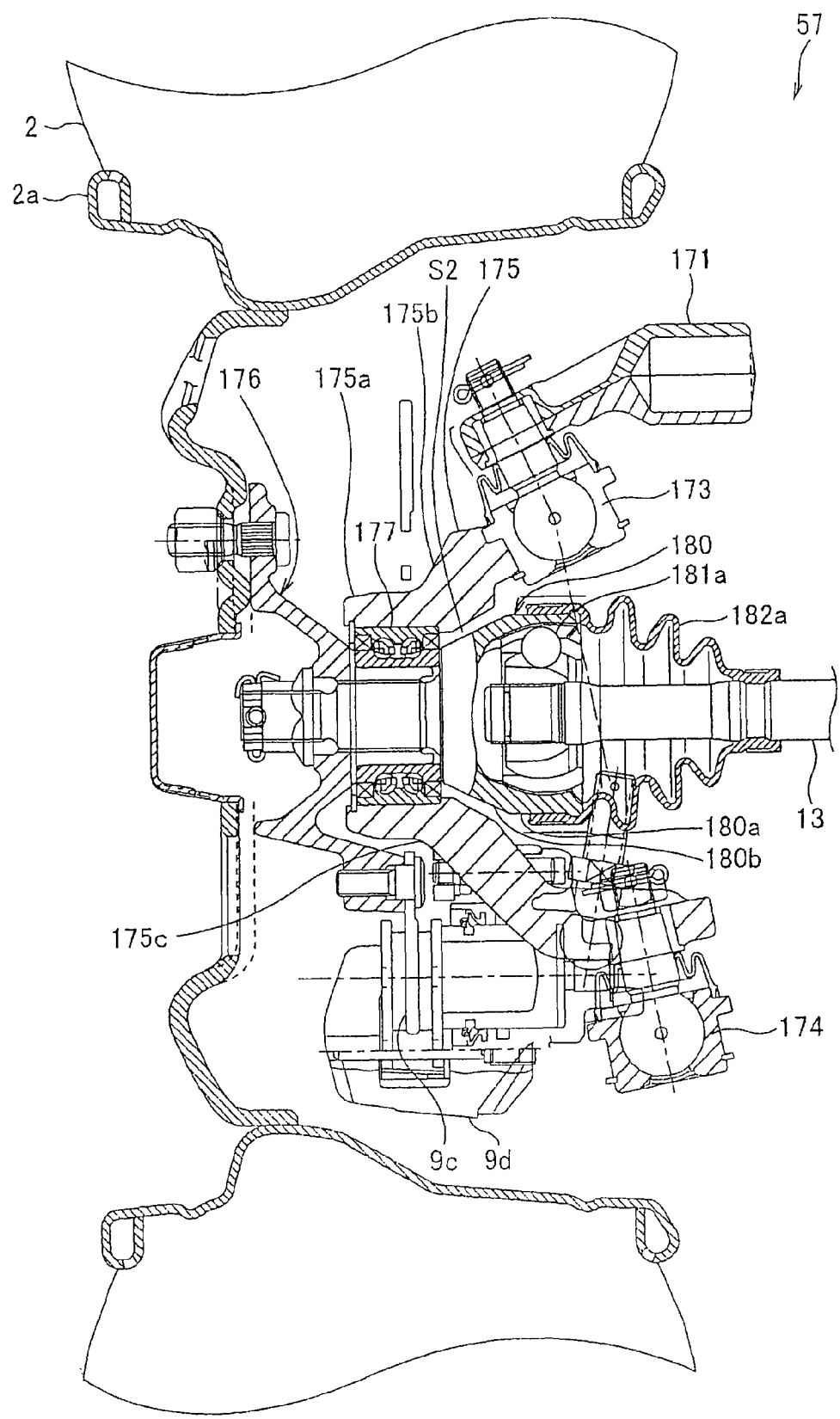
FIG. 12 shows a front suspension according to a first embodiment.

FIG. 12 shows the front suspension 57. Since the left and right front suspensions 57 are structurally symmetrical on the left and right sides, the front suspension 57 for suspending the front wheel 2 on one of the left and right sides will be described below. The front suspension 57 includes a front upper arm 171 and a front lower arm 172 (not shown) which constitutes a front suspension arm, base end parts of the arms 171, 172 are vertically swingably supported on the vehicle body frame 4, and tip parts of the arms 171, 172 are connected to the knuckle 175 through ball joints 173, 174, respectively. A hub 176 is rotatably borne on the knuckle 175 through a bearing 177, and a wheel element 2a of the front wheel 2 is connected to the outer side (the vehicle body outer side) of the hub 176. In addition, the lower end of the front cushion unit 58 is connected to the front lower arm 172, and the front wheel 2 is swingably suspended independently by these components.

A sealed bearing is used as the bearing 177 for bearing the hub 176, whereby a seal between the knuckle 175 and the wheel element 2a of the front wheel 2 and a seal between the knuckle 175 and an axle 180 to be described below are unnecessitated.

The axle 180 to which the drive shaft 13 is connected through a universal joint (equal-speed joint) 181a is provided on the inner side (the vehicle body inner side) of the hub 176, and these components ensure that the power from the engine 5 is transmitted from the front wheel side final speed reduction gear 11 through the drive shaft 13 to the axle 180 and the hub 176, whereby the front wheel 2 is driven to rotate. In addition, a connected part between the universal joint 181a and the drive shaft 13 is covered with a rubber-made boot 182a.

Figure 13B:
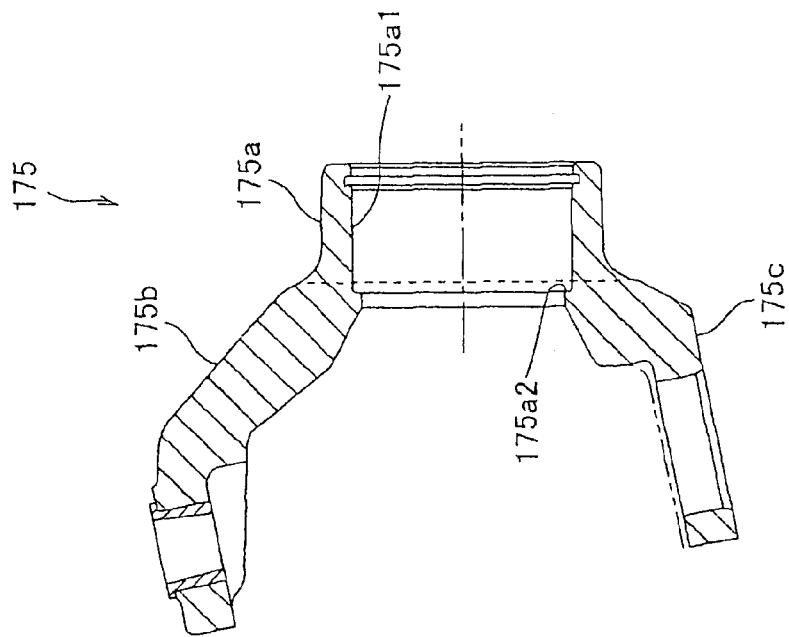
FIG. 13(B) shows a longitudinal section (Y2-Y2 section) of FIG. 13(A)
Figure 13A:
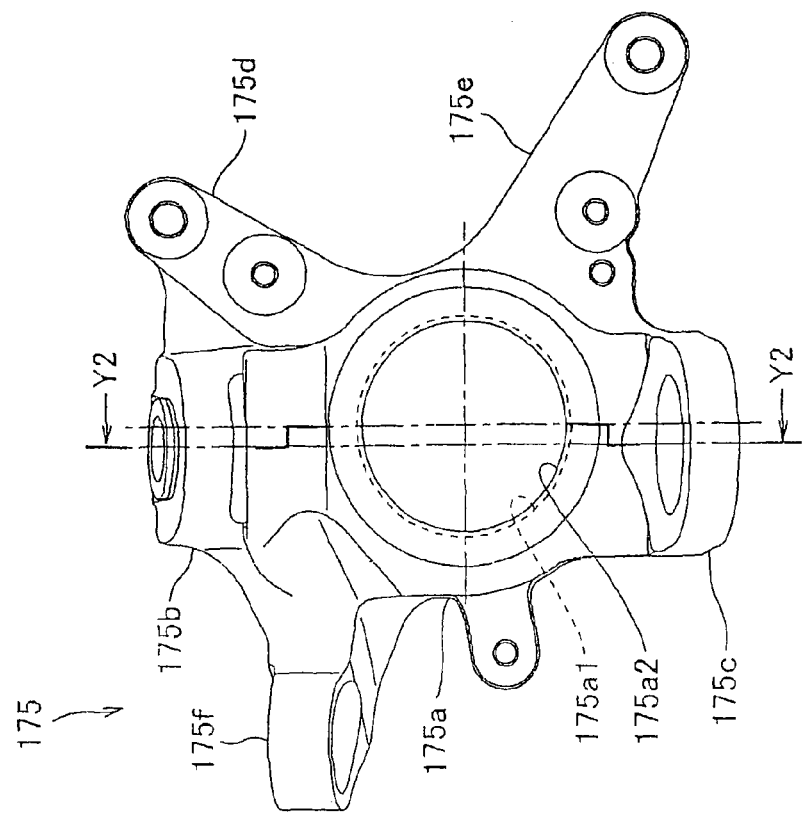
FIG. 13(A) shows a knuckle on the front side.

FIG. 13(A) shows the knuckle 175 on the front side, and FIG. 13(B) shows a longitudinal section (Y2-Y2 section) of FIG. 13(A). The knuckle 175 integrally includes a knuckle main body 175a for rotatably supporting the hub 176, an upper arm connection part 175b connected to the front upper arm 171, a lower arm connection part 175c connected to the front lower arm 172, a first arm 175d and a second arm 176e which are for attaching a brake caliper for a disk brake, and a third arm 175f connected to a steering system. The knuckle main body 175a is provided with an insertion hole 175a1 in which to insert the bearing 177, and the insertion hole 175a1 is provided at its depth part with an inward projected part 175a2 with which an outer ring of the bearing 177 comes into contact, whereby the bearing 177 is positioned.

A brake caliper 9d for pressing a pad against a brake disk 9c (see FIG. 12) attached to the hub 176 is attached to the first arm 175d and the second arm 175e, whereby a so-called wheel-in type disk brake device, which is accommodated in the wheel element 2a of the wheel 2, is configured. The steering system is connected to the third arm 175f of the knuckle 175 through a ball joint (not shown), and the front wheel 2 is steered as one body with the knuckle 175 according to a steering handle operation.

In this configuration, as shown in FIG. 12, the axle 180 has a large-diameter part 180a larger in diameter than a shaft part (the shaft part borne by the bearing 177) of the hub 176, a base end part of the large-diameter part 180a is formed as a tapered part 180b gradually increased in diameter as one goes away from the hub 176, and the upper arm connection part 175b and the lower arm connection part 175c of the knuckle 175 are formed in such shapes that the gap S2 between the connection part and the tapered part 180b is substantially constant from the depth side toward this side (the vehicle body center side).

More specifically, as shown in FIG. 12, base end parts of the upper arm connection part 175b and the lower arm connection part 175c extend respectively skewly upward and skewly downward along the tapered part 180b of the axle 180 by a distance substantially equal to the length of the tapered part 180b, to be connected to the front upper arm 171 and the front lower arm 172, respectively.

This ensures that the parts extending in tapered shapes (hereinafter referred to as the tapered extension parts) of the upper arm connection part 175b and the lower arm connection part 175c are formed to be substantially equal in length to the tapered part 180b of the axle 180, and that the gap S2 between the knuckle 175 and the outer peripheral surface of the axle 180 is formed to have a substantially constant spacing.

Therefore, even when foreign matter such as mud and soil has entered into the gap S2 between the knuckle 175 and the axle 180 during ATV mode running, the foreign matter having entered between the upper arm connection part 175b and the axle 180 can be easily discharged to the exterior by the centrifugal force generated due to the rotation of the axle 180 during the running, since the gap S2 has a substantially constant spacing. In addition, the foreign matter having entered between the lower arm connection part 175c and the axle 180 can also be easily discharged to the exterior by the centrifugal force and gravity. Further, since a seal part of the bearing 177 is disposed opposite to the depth side of the spacing S2, penetration of foreign matter into the bearing 177 can be prevented more securely.

In addition, since the knuckle 175 has the tapered extension part extending along the tapered part 180b of the axle 180 and the tapered extension part is formed to be substantially equal in length to the tapered part 180b, no step is present in the gap S2 between the knuckle 175 and the axle 180, whereby it can be ensured that foreign matter such as mud will hardly be caught in the gap S2.

Besides, since the surface, covering the axle 180, of the knuckle 175 (the inner peripheral surface of the tapered extension part) is formed as a tapered surface inclined to the outer periphery side toward a foreign matter entrance (an opening on the vehicle body center side), the foreign matter having entered into the gap S2 can be more easily discharged along the tapered surface to the exterior when being moved in the centrifugal direction attendant on the rotation of the axle 180.

Thus, in this embodiment, in both the rear suspension 81 and the front suspension 57, the gap S1, S2 between the knuckle 84, 175 and the outer peripheral surface of the axle 87, 180 is formed to have a spacing substantially constant from the depth side toward this side; therefore, the foreign matters having entered into the gaps S1, S2 can be easily discharged to the exterior, attendant on the rotation of the axles 87, 180 during running. In addition, since the seal parts of the bearings 85, 177 are disposed opposite to the depth side of the gaps S1, S2, penetration of foreign matter into the bearings 85, 177 can be prevented more securely.

Moreover, since the knuckles 84, 175 have the tapered extension parts extending along the tapered parts 87b, 180b of the axles 87, 180 and the tapered extension parts are formed to be substantially equal in length to the tapered parts 87b, 180b, no step is present in the gaps S1, S2 between the knuckles 84, 175 and the axles 87, 180, which can ensure that foreign matter such as mud will hardly be caught in the gaps S1, S2.

Besides, in this configuration, the tapered extension parts, covering the axles 87, 180, of the knuckles 84, 175 are set close to the axles 87, 180; therefore, the gaps S1, S2 between the knuckles 84, 175 and the axles 87, 180 can be made small, which also can ensure that foreign matter will hardly enter into the gaps S1, S2. In this case, the tapered extension parts of the knuckles 84, 175 can be set closer to the knuckle support parts 110, 160, so that it is also possible to contrive enhancement of strength of the knuckles 84, 175.

Figure 14:
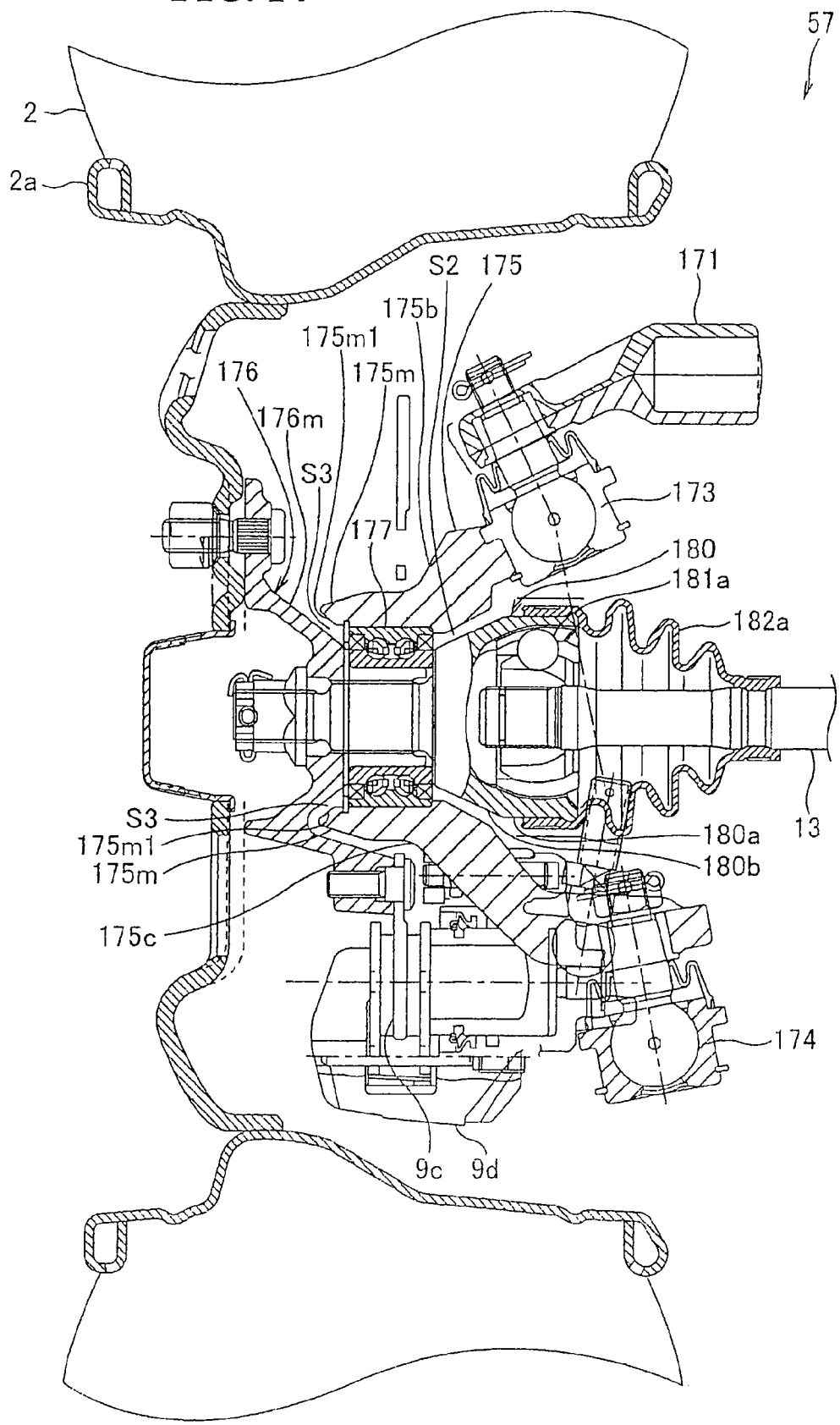
FIG. 14 shows a front suspension according to a second embodiment.
Figure 15:
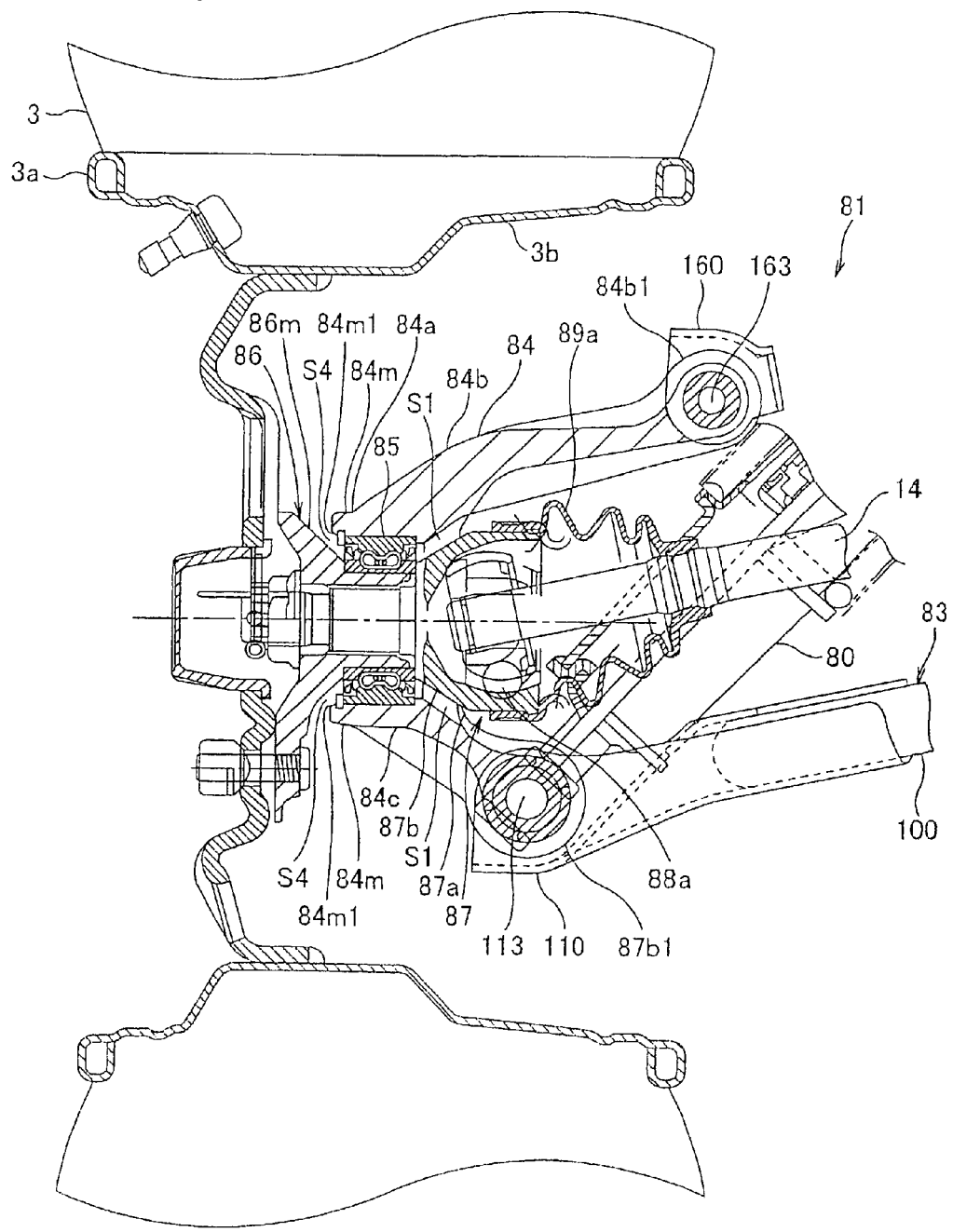
FIG. 15 shows a rear suspension according to the second embodiment.

FIG. 14 shows a front suspension 57 according to a second embodiment, and FIG. 15 shows a rear suspension 81 according to the second embodiment. In this embodiment, knuckles 175, 84 of the front suspension 57 and the rear suspension 81 are modified in shape so that gaps S3, S4 between knuckles 175, 84 and hubs 176, 86 are made to have substantially constant spacings, respectively. Incidentally, for convenience of description, substantially the same component parts as those in the first embodiment above are denoted by the same reference symbols as used above, and description of those component parts will be omitted.

As shown in FIG. 14, the hub 176 of the front suspension 57 has an enlarged diameter part enlarged in diameter along the direction toward a front wheel 2, as its connection part 176m connected to the front wheel 2. The knuckle 175 of the front suspension 57 has a part (hereinafter referred to as the hub covering part 175m) covering the outer periphery of the connection part 176m of the hub 176, and an inner peripheral surface 175m1 of the hub covering part 175m is formed as a tapered surface extending along the outer peripheral surface of the connection part 176m.

This ensures that the gap S3 between the knuckle 175 and the hub 176 has a spacing substantially constant from the depth side toward this side (the drive wheel (front wheel 2) side); therefore, even when foreign matter such as mud has entered into the gap S3, the foreign matter can be easily discharged to the exterior, attendant on the rotation of the hub 176 during running. In addition, since the surface 175m1, covering the outer periphery of the hub 176, of the knuckle 175 is formed as the tapered surface, the foreign matter having entered into the gap S3 can be more easily discharged along the tapered surface 175m1 to the exterior when being moved in the centrifugal direction attendant on the rotation of the hub 176. Besides, since a seal part of the bearing 177 is disposed opposite to the depth side of the gap S3, penetration of foreign matter into the bearing 177 can be prevented more securely.

In addition, as shown in FIG. 15, also in the hub 86 of the rear suspension 81, like in the hub 176 above, a connection part 86m connected to a rear wheel 3 is formed as an enlarged diameter part enlarged in diameter along the direction toward the rear wheel 3, the knuckle 84 has a part (hereinafter referred to as the hub covering part 84m) covering the outer periphery of the connection part 86m of the hub 86, and an inner peripheral surface 84m1 of the hub covering part 84m is formed as a tapered surface extending along the outer peripheral surface of the connection part 86m.

This can ensure that the gap S4 between the knuckle 84 and the hub 86 has a spacing substantially constant from the depth side toward this side (the drive wheel (rear wheel 3) side), so that even when foreign matter such as mud has entered into the gap S4, the foreign matter can be easily discharged to the exterior, attendant on the rotation of the hub 86 during running. In addition, since the surface 84m1, covering the outer periphery of the hub 86, of the knuckle 84 is formed as the tapered surface, the foreign matter having entered into the gap S4 can be more easily discharged along the tapered surface 84m1 to the exterior when being moved in the centrifugal direction attendant on the rotation of the hub 86. Besides, since a seal part of the bearing 85 is disposed opposite to the depth side of the spacing S3, penetration of foreign matter into the bearing 85 can be prevented more securely.

Figure 16:
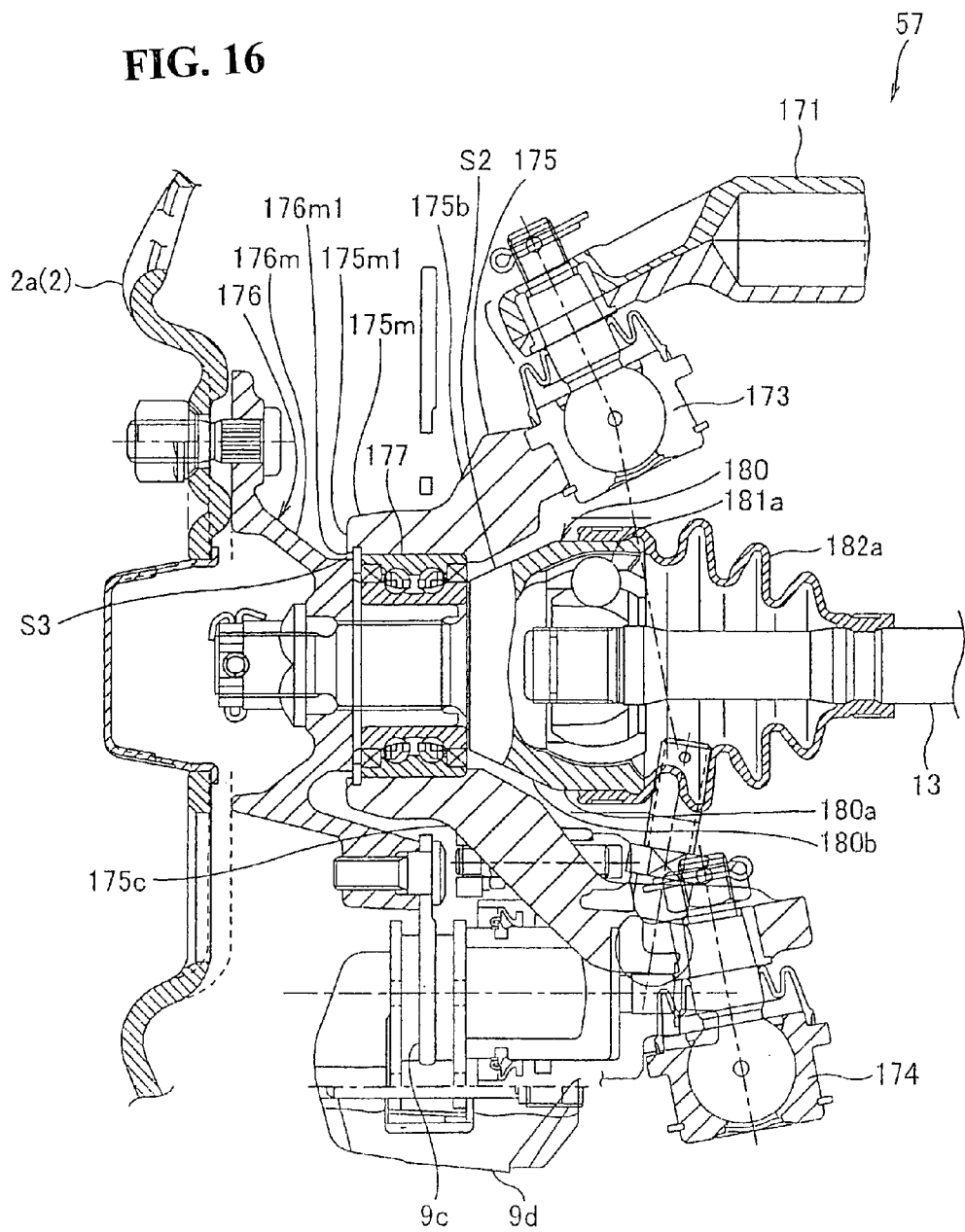
FIG. 16 shows a front suspension according to a third embodiment.
Figure 17:
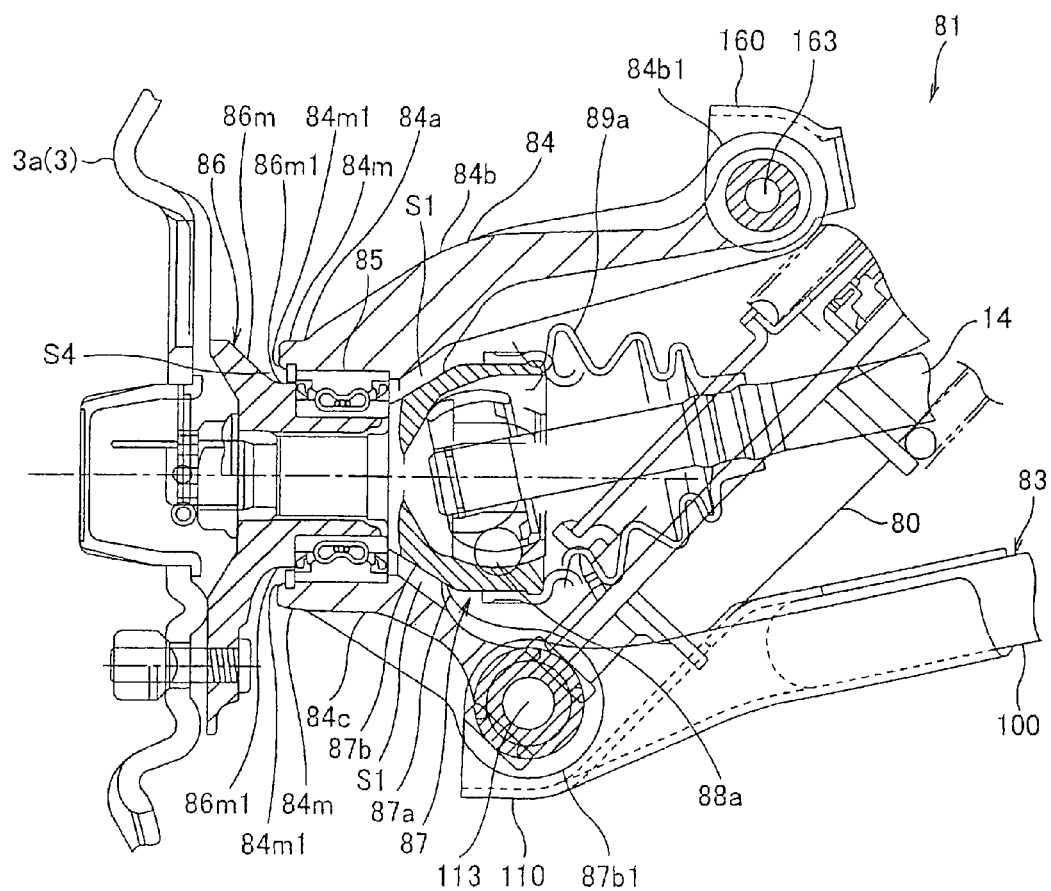
FIG. 17 shows a rear suspension according to the third embodiment.
Figure 18:
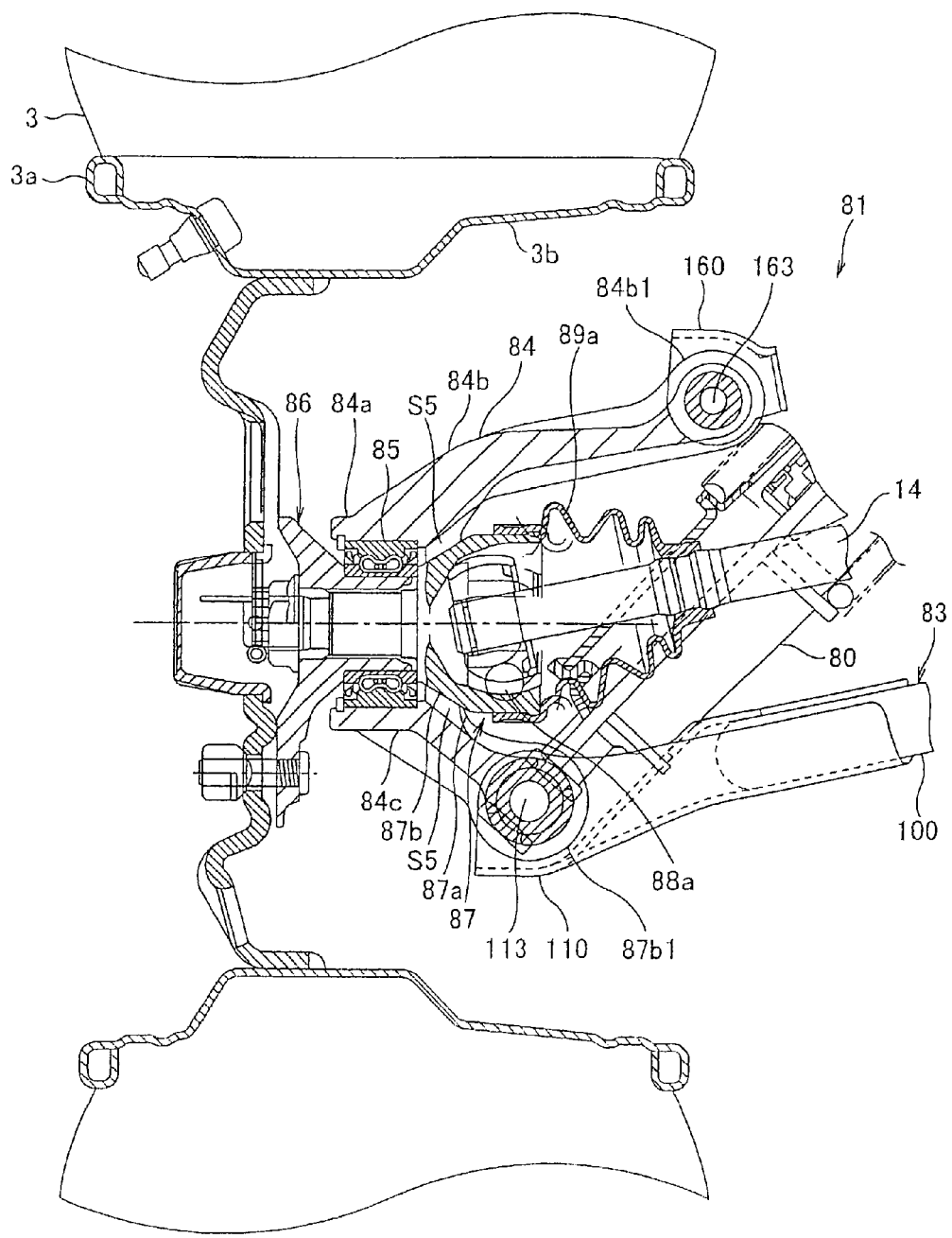
FIG. 18 shows an example of a rear suspension according to a modified embodiment.

FIG. 16 shows a front suspension 57 according to a third embodiment, and FIG. 17 shows a rear suspension 81 according to the third embodiment. In this embodiment, hubs 176, 81 in the front suspension 57 and the rear suspension 86 are modified in shape so that gaps S3, S4 between knuckles 175, 84 and hubs 176, 86 are made to have substantially constant spacings, respectively. Incidentally, for convenience of description, substantially the same component parts as those in the above-described embodiments are denoted by the same reference symbols as used above, and description of those component parts will be omitted.

As shown in FIG. 16, the knuckle 175 of the front suspension 57 has a configuration in which a hub covering part 175m covering the outer periphery of a connection part 176m, connected to a front wheel 2, of the hub 176 is formed to have an inner peripheral surface 175m1 in the shape of a substantially horizontal surface. The hub 176 of the front suspension 57 has a configuration in which its surface 176m1 covered by the hub covering part 175m of the knuckle 175 is a surface along the inner peripheral surface 175m1 of the hub covering part 175m. This ensures that the gap S3 between the knuckle 175 and the hub 176 has a spacing substantially constant from the depth side toward this side (the drive wheel (front wheel 2) side), so that even when foreign matter such as mud has entered into the gap S3, the foreign matter can be easily discharged to the exterior, attendant on the rotation of the hub 176 during running. In addition, since a seal part of a bearing 177 is disposed opposite to the depth side of the gap S3, penetration of foreign matter into the bearing 177 can be prevented more securely.

As shown in FIG. 17, also in the knuckle 84 of the rear suspension 81, a hub covering part 84m covering the outer periphery of a connection part 86m, connected to a rear wheel 3, of the hub 86 is formed to have an inner peripheral surface 84m1 in the shape of a substantially horizontal surface, and a surface 86m1, covered by the hub covering part 84m of the knuckle 84, of the hub 86 is a surface along the inner peripheral surface 84m1 of the hub covering part 84m. This ensures that the gap S4 between the knuckle 84 and the hub 86 has a spacing substantially constant from the depth side toward this side (the drive wheel (rear wheel 3) side), so that even when foreign matter has entered into the gap S4, the foreign matter can be easily discharged to the exterior, attendant on the rotation of the hub 86 during running. In addition, since a seal part of a bearing 85 is disposed opposite to the depth side of the spacing S4, penetration of foreign matter into the bearing 85 is prevented more securely.

Figure 19:
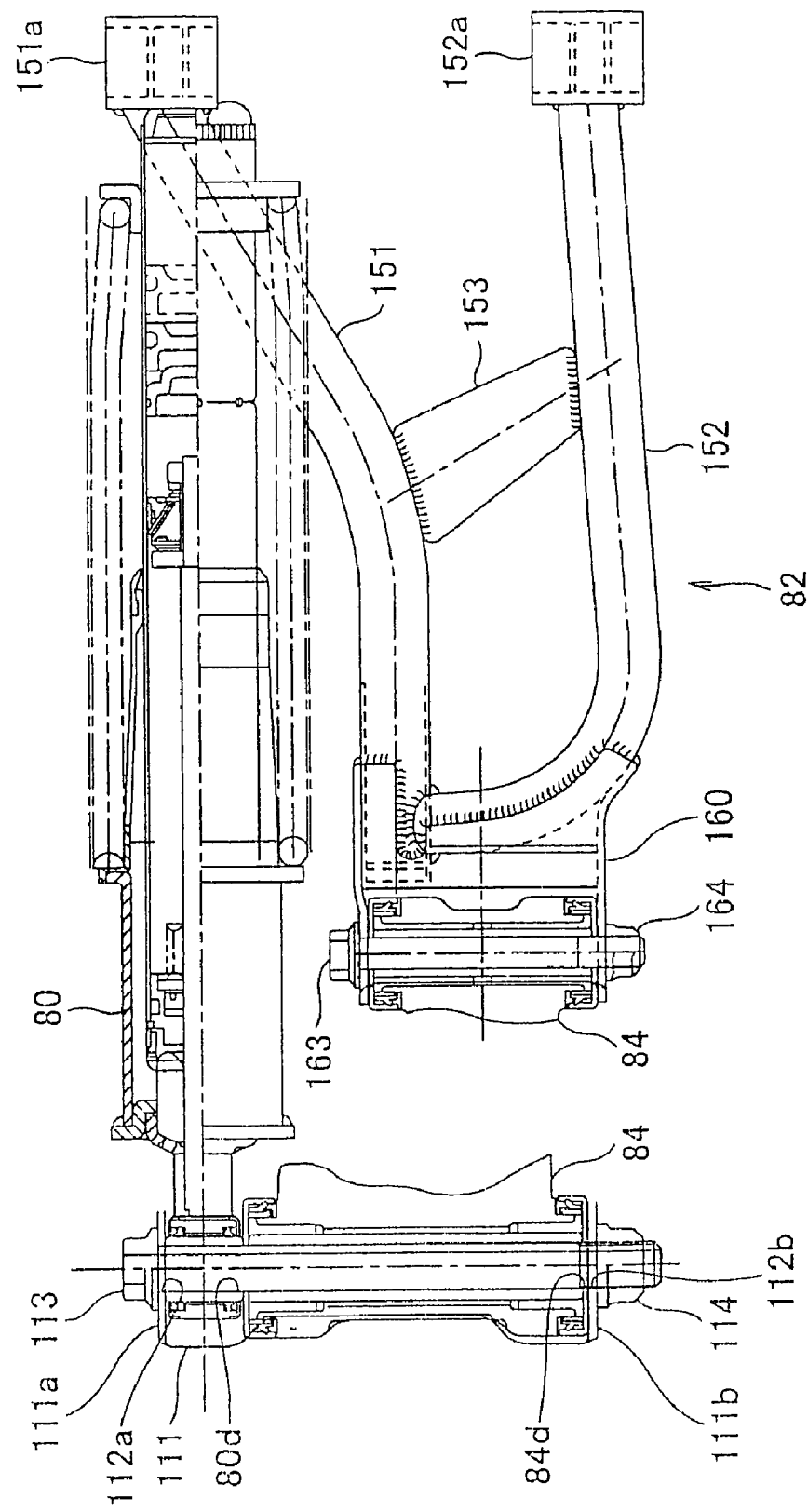
FIG. 19 shows a rear upper arm together with the configuration in the surroundings thereof.

FIG. 19 shows the rear upper arm 82 together with the configuration in the surroundings thereof. The rear upper arm 82 includes a front arm 151 and a rear arm 152 which are composed of pipe members, a cross member 153 bridgingly disposed between the front arm 151 and the rear arm 152, and a knuckle support part (also called pivot part) 160 for supporting an upper end part of the knuckle 84.

The front arm 151 and the rear arm 152 constitute an arm part extending between the knuckle support part 160 and the vehicle body frame 4, and hold passing parts 151a and 152a provided therein with through-holes substantially in the vehicle body front-rear direction are attached to end parts of the arms 151 and 152, respectively. The bolt passing parts 151a, 152a are respectively connected to the upper arm support parts 71, 72 (see FIG. 3) through long-shaft holts 154, 155 and nuts 157, 158 which are shown in FIG. 3.

The knuckle support part 160 is formed in a roughly angular U-shaped cross-sectional shape opened to the lower side, by bending a metallic plate member by press molding, and its base end part is joined to tip parts of the front arm 151 and the rear arm 152 by welding or the like. An upper end part of the knuckle 84 is turnably connected to the knuckle support part 160 through a long-shaft bolt 163, and the long-shaft bolt 163 is fixed to the knuckle support part 160 by a nut 164.

FIGS. 20 and 21(A) to 21(C) show the rear lower arm 83. The rear lower arm 83 includes a bent pipe 100 which is a pipe member bent in a roughly U shape, and a knuckle support part (also called pivot part) 110 for supporting the knuckle part 84.

The bent pipe 100, as shown in FIG. 4, constitutes an arm part extending between the knuckle support part 110 and the vehicle body frame 4. The bent pipe 100, as shown in FIG. 21(B), includes a front arm 101, a rear arm 102 disposed on the rear side of the front arm 101, and a cross member 103 bridgingly disposed between the front arm 101 and the rear arm 102. Bolt passing parts 101a, 102a provided therein with through-holes substantially in the vehicle body front-rear direction are attached respectively to end parts of the front arm 101 and the rear arm 102, and the bolt passing holes 101a, 102a are connected to the lower arm support parts 72, 73 through long-shaft bolts 75, 76, as shown in FIG. 3.

Here, shaft parts of the long-shaft bolts 75, 76 are provided respectively with bulging parts 75a, 76a, and the bulging parts 75a, 76a are supported by the lower arm support parts 72, 73, whereby the rear lower arm 83 is supported on the vehicle body frame 4 so that it can be vertically swung and can be inclined to the front and rear sides. Incidentally, with a similar configuration, the rear upper arm 82 is also supported on the vehicle body frame 4 so that it can be vertically swung and can be inclined to the front and rear side.

An arm-side stabilizer support part 101b for supporting the stabilizer together with a stabilizer support part 74 provided at the lower pipe 42 is attached to the front arm 101, and, when the left and right rear wheels 3 are moved in vertical reverse phases, the stabilizer restrains the motion of the rear lower arm 83, whereby inclination (rolling) of the vehicle body can be restrained.

A bracket 104 is attached to the rear arm 102, the bracket 104 and the cross member 103 are provided with bolt holes 104a, 103a, respectively, and an inboard-side boot cover 120 (see FIG. 20) is attached by bolts and nuts through the bolt holes 104a, 103a. The inboard-side boot cover 120 is a resin-made plate member for covering the boot 89b (see FIG. 4) on the base end part side of the drive shaft 14 from the lower side, and protects the boot 89b, the universal joint 88b in the boot 89b, and the like against stones flying from the vehicle body front side or the lower side and against obstacles.

The knuckle support part 110 is formed by bending a metallic plate member by press molding, and its base end part (connection part) 110a is joined to a tip part of the bent pipe 100 by welding or the like. More in detail, as shown in FIG. 21(B), the knuckle support part 110 is press molded in a roughly U-shaped cross-sectional shape such that the width La of its base end part (connection part) 110a connected to the bent pipe 100 is greater than the width Lb of its tip part (knuckle and cushion lower end support part) 111, and, therefore, a front-rear pair of side walls 111a, 111b are integrally formed, with a spacing therebetween in the vehicle body front-rear direction.

The spacing Lb1 on the tip part 111 side of the front-rear pair of side walls 111a, 111b is set to such a distance that when the lower end of the knuckle 84 and the lower end of the rear cushion unit 80 are inserted between the side walls 111a and 111b in the state of being arrayed side by side in the front-rear direction, as shown in FIG. 20, these lower ends are substantially clamped by the side walls 111a and 111b from the front and rear sides.

In addition, the side walls 111a, 111b are provided with through-holes 112a, 112b which communicate with bolt passing holes 84d, 80d, provided respectively in the lower end of the knuckle 84 and the lower end of the rear cushion unit 80, when the lower ends are inserted between the side walls 111a, 111b in such a condition that the bolt passing holes 84d, 80d are aligned coaxially.

Therefore, by inserting a long-shaft bolt 113 in a through-hole 112a in the side wall 111a, the bolt passing hole 80d in the lower end of the rear cushion unit 80, the bolt passing hole 84d in the lower end of the knuckle 84, and the through-hole 112b in the side wall 111b in the condition where all these through-holes communicate with each other and by fastening a nut 114 to the long-shaft bolt 113, it is possible to coaxially support the knuckle 84 and the rear cushion unit 80 on the knuckle support part 110 through the long-shaft bolt 113.

In this configuration, the rear cushion unit 80 is supported on the vehicle body front side relative to the knuckle 84. With this configuration, it is possible to obviate interference between the rear cushion unit 80 and the drive shaft 14 for transmitting power to the hub 86 supported by the knuckle 84. Besides, as shown in FIG. 5, the width of the rear upper arm 82 is set smaller than the width of the rear arm 83 and the rear cushion unit 80 is located on the front side of the rear upper arm 82, whereby interference of the rear cushion unit 80 with the rear upper arm 82 is also obviated.

As shown in FIGS. 21(A) to 21(C), a base end part 120 of the knuckle support part 110 is formed in a centrally projected sectional shape such that a roughly central part 120a thereof in the vehicle body front-rear direction is raised upward as one goes from the tip part 111 toward the vehicle body center side. The knuckle support part 110 has a configuration in which a base end part of its central part 120a is welded to the upper side of the bent pipe 100, and front and rear parts 120b, 120c on the front and rear sides of the central part 120a are welded to the lower side of the bent pipe 100. This ensures that the base end part 120 of the knuckle support part 110 is joined to the bent pipe 100 in the state of clamping the bent pipe 100 from the upper and lower sides, whereby the knuckle support part 110 and the bent pipe 100 can be joined to each other with high strength. In addition, since the knuckle support part 110 is formed in a sectional shape having recessed and projected parts, the modulus of section is high, and the rigidity of the knuckle support part 110 can be secured sufficiently.

Figure 22B:
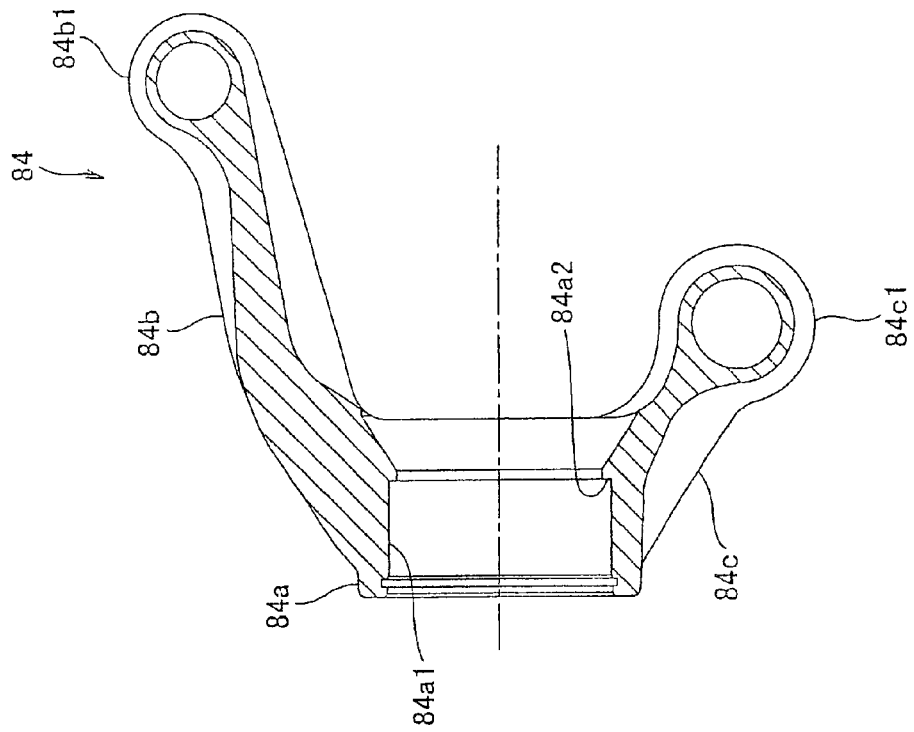
FIG. 22(B) shows a longitudinal section (Y1-Y1 section) of FIG. 22(A)
Figure 22A:
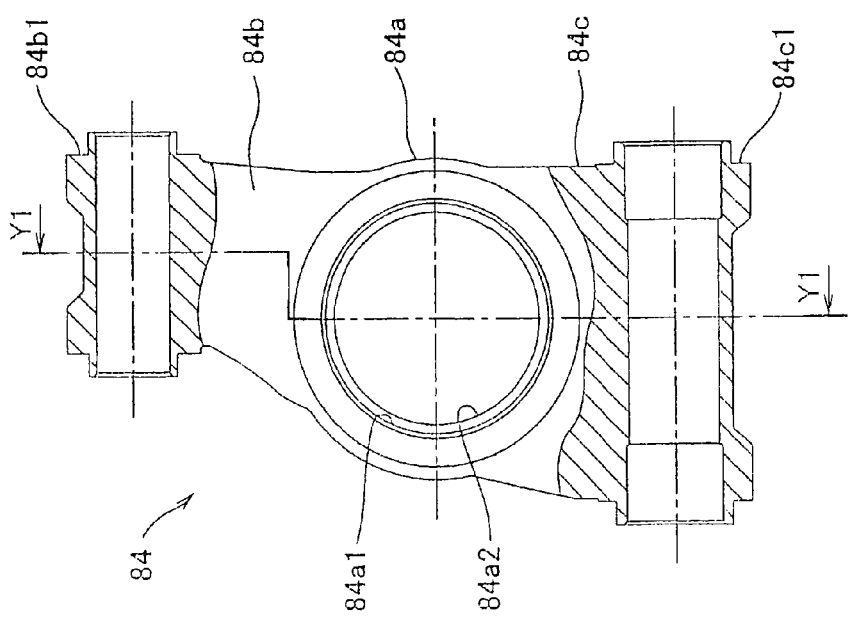
FIG. 22(A) shows a rear knuckle.

FIG. 22(A) shows the knuckle 84 on the rear side, and FIG. 22(B) shows a longitudinal section (Y1-Y1 section) of FIG. 22(A). The knuckle 84 integrally includes a knuckle main body 84a for rotatably supporting the hub 86, an upper arm connection part 84b connected to the rear upper arm 82, and a lower arm connection part 84c connected to the rear lower arm 83. The knuckle main body 84a is provided with an insertion hole 84a1 in which to insert the bearing 85 (see FIG. 4), and the insertion hole 84a1 is provided at its depth part with an inward projected part 84a2 with which an outer ring of the bearing 85 comes into contact, whereby the bearing 85 is positioned.

The upper arm connection part 84b extends skewly upward from an upper part of the knuckle main body 84a, and a bolt passing part 84b1 provided at its end part is turnably connected to the rear upper arm 82 through a long-shaft bolt 163 (see FIG. 20). In addition, the lower arm connection part 84c extends skewly downward from a lower part of the knuckle main body 84a, and a bolt passing part 84c1 provided at its end part is turnably connected to the rear upper arm 82 through the long-shaft bolt 113 (see FIG. 19).

As shown in FIG. 4, the axle 87 is located between the upper arm connection part 84b and the lower arm connection part 84c, and the knuckle 84, the hub 86 and the axle 87 are configured to be substantially vertically swingable, with a connection start point (the axis of the long-shaft bolts 113, 163) as a reference.

Figure 23:
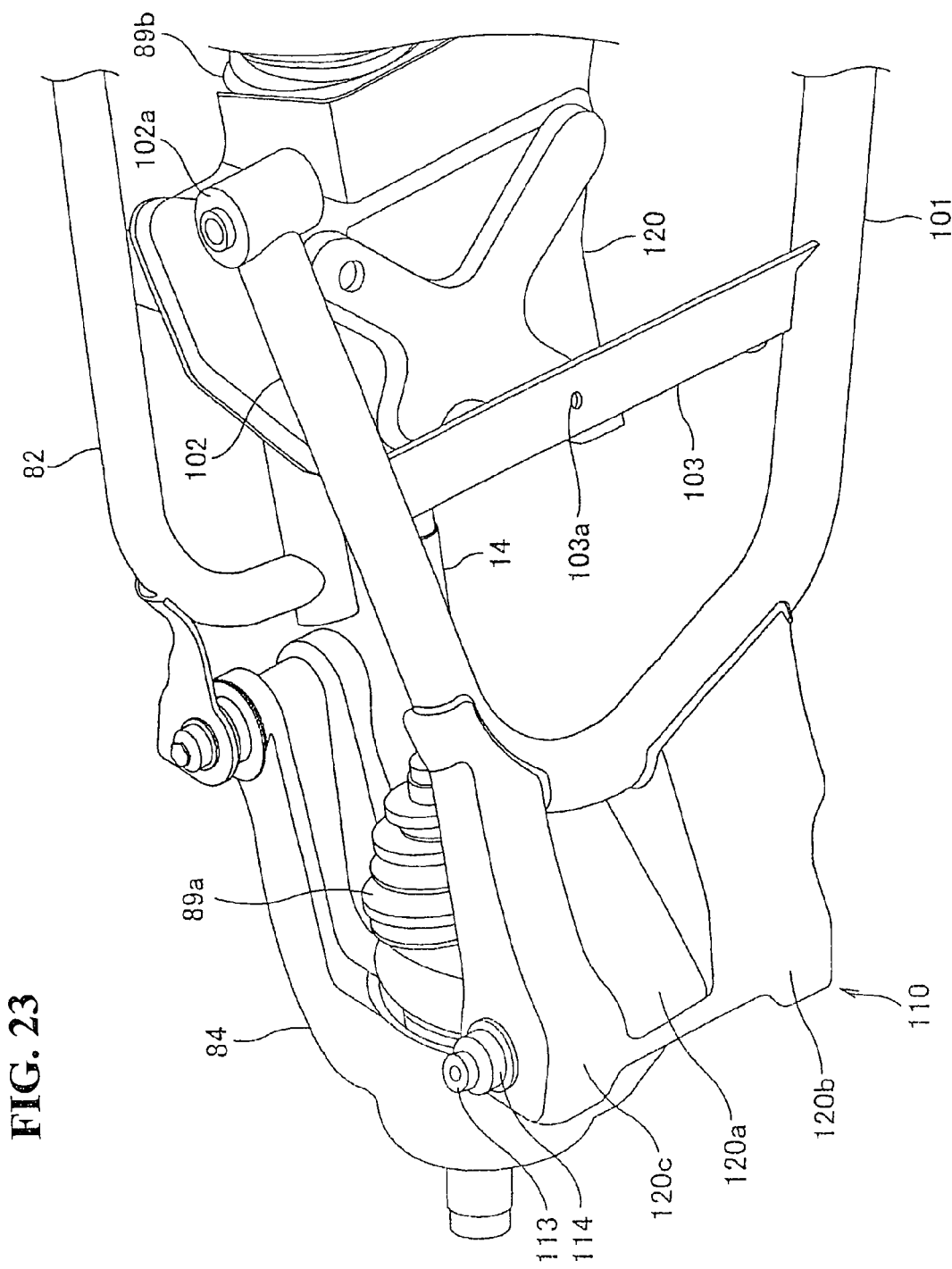
FIG. 23 is a perspective view showing the rear lower arm together with the configuration in the surroundings thereof.

In addition, in the case where the rear wheel 3 is connected to the hub 86 supported by the knuckle 84 as shown in FIG. 4, the knuckle support part 110 extends between the rim 3b of the wheel element 3a and the bent pipe 100, to cover the lower side of the boot 89a on the tip part side of the drive shaft 14 and the lower side of the lower end of the rear cushion 80, as shown in FIG. 23. Therefore, the knuckle support part 110 can not only function as a part of the rear lower arm 83 but also function as an outboard-side boot cover for protecting the boot 89a, the universal joint 88b in the boot 89b, and the rear cushion unit 80 against stones flying from the vehicle body front side or the lower side and against obstacles.

Thus, in this embodiment, the lower end of the rear cushion unit 80 is coaxially supported on the knuckle support part 110 of the rear lower arm 83, so that a long distance can be secured from the position of supporting the upper end of the rear cushion unit 80 (the bracket 70 (see FIG. 4) in the vicinity of the upper pipe 41) to the position of supporting the lower end of the rear cushion unit 80. This makes it possible to sufficiently secure a cushion stroke length.

In addition, since the knuckle 84 and the lower end of the rear cushion unit 80 are supported coaxially, the support component parts (the long-shaft bolt 113, the nut 114) for supporting the knuckle 84 on the knuckle support part 110 can be used also as support component parts for the rear cushion unit 80, whereby the number of component parts can be reduced and complication of structure can be obviated. Besides, as compared with the conventional configuration in which it is necessary to use a comparatively large cross member for providing the cushion support part at an intermediate part of the lower arm, the cross member 103 for the rear lower arm 83 can be made small in size, so that an increase in weight due to an increase in the cross member size can be obviated.

In addition, in this embodiment, the knuckle support part 110 is formed by bending a plate member, so that the modulus of section of the knuckle support part 110 can be enhanced, and sufficient rigidity can be secured. Moreover, since the knuckle support part 110 has a configuration in which the width Lb of its support part (corresponding to the tip part 111) for supporting the knuckle 84 and the lower end of the rear cushion unit 80 is larger than the width La of its connection part (base end part 110a) connected to the bent pipe 100 functioning as an arm part, the strength of connection between the knuckle support part 110 and the arm part can be secured sufficiently, which also makes it possible to sufficiently secure the rigidity of the knuckle support part 110.

Further, since the plate member constituting the knuckle support part 110 covers the lower side of the boot 89a covering the connected part between the drive shaft 14 and the axle 87 and also covers the lower side of the lower end of the rear cushion unit 80, it is unnecessary to separately provide an outboard-side boot cover, which also makes it possible to reduce the number of component parts, to obviate an increase in weight, and to obviate complication of structure.

Still further, in this embodiment, since the rear cushion unit 80 is supported on the vehicle body front side relative to the knuckle 84, it is possible to obviate interference between the rear cushion unit 80 and the drive shaft 14. In addition, since the width of the rear upper arm 82 is set smaller than the width of the rear lower arm 83 and the rear cushion unit 80 is located on the front side of the rear upper arm 82, it is possible to avoid interference between the rear cushion unit 80 and the rear upper arm 82. Therefore, a good cushion layout can be realized easily.

While the present invention has been described based on one embodiment thereof as above, the present invention naturally is not limited to the embodiment. For example, while the case where the knuckle support part 110 is composed of a metallic plate member has been described in the embodiment above, the knuckle support part 110 is not limited to this and may be composed of a plate member of other rigid material than a metal, such as a synthetic resin.

In addition, while the case of applying the present invention to the suspension arms for the rear wheels 3 has been described in the embodiment above, the application of the present invention is not limited to this, and the present invention may naturally be applied to suspension arms for the front wheels 2.

Further, the application of the present invention is not limited to the application to the double Wishbone type suspension as above-mentioned, and the present invention may be applied to other type suspensions. Further, while the case of applying the present invention to a suspension arm structure in an ATV (all terrain vehicle) has been described in the embodiment above, the application of the invention is not limited to this, and the invention can be widely applied to suspension arm structures for vehicles other than ATV.

Furthermore, while the case where the gap S1, S2 between the knuckle and the axle is formed to have a substantially constant spacing has been described in the embodiments above, the invention is not limited to this configuration. For example, a configuration may be adopted in which, as exemplified in FIG. 16, the gap S1, S2 has a tapered spacing S5 so that the gap is gradually widened along the direction from the depth side toward this side. According to this configuration, the gap is gradually widened along the direction toward a foreign matter entrance (an opening on the vehicle body center side), so that it is possible to obviate the situation in which a foreign matter might enter into and be caught in the gap because a foreign matter entrance (an opening on the vehicle body center side) is narrow and the gap is wider on the depth side. According to this configuration, further, even if penetration of a foreign matter such as mud has occurred, the foreign matter can be easily discharged to the exterior, attendant on the rotation of the axle 180 during running. Also, in the cases of the gaps S3, S4 between the knuckles 175, 84 and the hubs 176, 86, the gaps are not limited to those having substantially constant spacings, but may be tapered gaps so that the gap is gradually widened along the direction from the depth side toward this side (the drive wheel (front wheel 2, or rear wheel 3) side).

What is claimed is:

1. A suspension arm and cushion support structure comprising:
    left and right wheels each independently and swingably suspended on a frame through a suspension arm;
    a drive shaft for transmitting power from an engine to each of said wheels;
    a hub connected to a wheel element of said wheel;
    a knuckle support part of said suspension arm being connected to said hub through a knuckle;
    an axle connected to said hub, said drive shaft being connected to said axle through a universal joint, and the connected part being covered with a boot,
    wherein said knuckle support part of said suspension arm is formed from a plate member extended from a rim of said wheel element toward a vehicle body inner side so as to cover the lower side of said boot.

2. The suspension arm and cushion support structure as set forth in claim 1, wherein said suspension arm comprises a pipe member swingably supported on said frame, and said knuckle support part is joined to said pipe member and extends between said pipe member and said wheel element.

3. The suspension arm and cushion support structure as set forth in claim 1, wherein a cushion unit is interposed between said suspension arm and said frame, and said knuckle support part covers the lower side of a lower end part of said cushion unit.

4. The suspension arm and cushion support structure as set forth in claim 2, wherein a cushion unit is interposed between said suspension arm and said frame, and said knuckle support part covers the lower side of a lower end part of said cushion unit.

5. The suspension arm and cushion support structure as set forth in claim 1, wherein said suspension arm includes of upper and lower arms, said knuckle is supported by said upper and lower arms and provides rotatable support for said right and left wheels, and further comprising:
    a cushion being provided for absorbing shocks transmitted to said wheel, the cushion having lower end that is coaxially supported on a knuckle support part of said lower arm.

* * * * *